(12) United States Patent
Islam et al.

(10) Patent No.: US 6,985,283 B1
(45) Date of Patent: Jan. 10, 2006

(54) FIBER-OPTIC COMPENSATION FOR DISPERSION, GAIN TILT, AND BAND PUMP NONLINEARITY

(75) Inventors: Mohammed N. Islam, Allen, TX (US); Mohammed A. Islam, Endicott, NY (US); Michael R. Slawson, Alpharetta, GA (US)

(73) Assignees: Xtera Communications, Inc., Allen, TX (US); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/719,591

(22) PCT Filed: Jun. 16, 1999

(86) PCT No.: PCT/US99/13551

§ 371 (c)(1),
(2), (4) Date: Dec. 12, 2000

(87) PCT Pub. No.: WO99/66607

PCT Pub. Date: Dec. 23, 1999

Related U.S. Application Data

(60) Provisional application No. 60/089,426, filed on Jun. 16, 1998.

(51) Int. Cl.
*H01S 3/00* (2006.01)

(52) U.S. Cl. .................................... 359/334

(58) Field of Classification Search ............... 359/334; 398/160
See application file for complete search history.

(56) References Cited

U.S. PATENT DOCUMENTS

| | | | |
|---|---|---|---|
| 4,063,106 A | 12/1977 | Ashkin et al. | 307/88.3 |
| 4,616,898 A | 10/1986 | Hicks, Jr. | 350/96.15 |
| 4,685,107 A | 8/1987 | Kafka et al. | 372/6 |
| 4,699,452 A | 10/1987 | Mollenauer et al. | 350/96.16 |
| 4,740,974 A | 4/1988 | Byron | 372/3 |
| 4,831,616 A | 5/1989 | Huber | 370/3 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,039,199 A | 8/1991 | Mollenauer et al. | 359/334 |
| 5,050,183 A | 9/1991 | Duling, III | 372/94 |
| 5,058,974 A * | 10/1991 | Mollenauer | 385/27 |
| 5,078,464 A | 1/1992 | Islam | 385/122 |
| 5,101,456 A | 3/1992 | Islam | 385/27 |
| 5,107,360 A | 4/1992 | Huber | 359/124 |
| 5,115,488 A | 5/1992 | Islam et al. | 385/129 |
| 5,117,196 A | 5/1992 | Epworth et al. | 359/333 |
| 5,132,976 A | 7/1992 | Chung et al. | 372/6 |
| 5,134,620 A | 7/1992 | Huber | 372/6 |
| 5,140,456 A | 8/1992 | Huber | 359/341 |
| 5,151,908 A | 9/1992 | Huber | 372/6 |
| 5,153,762 A | 10/1992 | Huber | 359/125 |
| 5,159,601 A | 10/1992 | Huber | 372/6 |
| 5,166,821 A | 11/1992 | Huber | 359/238 |
| 5,187,760 A | 2/1993 | Huber | 385/37 |
| 5,191,586 A | 3/1993 | Huber | 372/6 |
| 5,191,628 A | 3/1993 | Byron | 385/27 |
| 5,200,964 A | 4/1993 | Huber | 372/26 |
| 5,208,819 A | 5/1993 | Huber | 372/32 |
| 5,210,631 A | 5/1993 | Huber et al. | 359/132 |
| 5,212,579 A | 5/1993 | Huber et al. | 359/182 |
| 5,218,655 A | 6/1993 | Mizrahi | 385/39 |
| 5,222,089 A | 6/1993 | Huber | 372/6 |
| 5,225,925 A | 7/1993 | Grubb et al. | 359/341 |
| 5,226,049 A | 7/1993 | Grubb | 372/6 |
| 5,243,609 A | 9/1993 | Huber | 372/9 |
| 5,244,194 A | 9/1993 | Islam | 385/122 |
| 5,257,124 A | 10/1993 | Glaab et al. | 359/124 |
| 5,268,910 A | 12/1993 | Huber | 372/6 |
| 5,271,024 A | 12/1993 | Huber | 372/6 |
| 5,283,686 A | 2/1994 | Huber | 359/337 |
| 5,293,545 A | 3/1994 | Huber | 359/111 |
| 5,295,016 A | 3/1994 | Van Deventer | 359/347 |
| 5,295,209 A | 3/1994 | Huber | 385/37 |
| 5,301,054 A | 4/1994 | Huber et al. | 359/132 |

| Patent | Date | Inventor | Class |
|---|---|---|---|
| 5,321,543 A | 6/1994 | Huber | 359/187 |
| 5,321,707 A | 6/1994 | Huber | 372/6 |
| 5,323,404 A * | 6/1994 | Grubb | 372/6 |
| 5,331,449 A | 7/1994 | Huber et al. | 359/125 |
| 5,359,612 A | 10/1994 | Dennis et al. | 372/18 |
| 5,369,519 A | 11/1994 | Islam | 359/173 |
| 5,373,389 A | 12/1994 | Huber | 359/195 |
| 5,389,779 A | 2/1995 | Betzig et al. | 250/216 |
| 5,400,166 A | 3/1995 | Huber | 359/173 |
| 5,416,629 A | 5/1995 | Huber | 359/182 |
| 5,450,427 A | 9/1995 | Fermann et al. | 372/18 |
| 5,467,212 A | 11/1995 | Huber | 359/168 |
| 5,473,622 A | 12/1995 | Grubb | 372/6 |
| 5,477,555 A | 12/1995 | Debeau et al. | 372/25 |
| 5,479,291 A | 12/1995 | Smith et al. | 359/333 |
| 5,485,481 A | 1/1996 | Ventrudo et al. | 372/6 |
| 5,485,536 A | 1/1996 | Islam | 385/31 |
| 5,497,386 A | 3/1996 | Fontana | 372/18 |
| 5,504,609 A | 4/1996 | Alexander et al. | 359/125 |
| 5,504,771 A | 4/1996 | Vahala et al. | 372/94 |
| 5,513,194 A | 4/1996 | Froberg et al. | 372/6 |
| 5,521,738 A | 5/1996 | Froberg | 359/184 |
| 5,530,710 A | 6/1996 | Grubb | 372/6 |
| 5,532,864 A | 7/1996 | Alexander et al. | 359/177 |
| 5,541,947 A | 7/1996 | Mourou et al. | 372/25 |
| 5,542,011 A | 7/1996 | Robinson | 385/24 |
| 5,555,118 A | 9/1996 | Huber | 359/125 |
| 5,557,442 A | 9/1996 | Huber | 359/179 |
| 5,559,920 A | 9/1996 | Chraplyvy et al. | 385/123 |
| 5,577,057 A | 11/1996 | Frisken | 372/18 |
| 5,579,143 A | 11/1996 | Huber | 359/130 |
| 5,600,473 A | 2/1997 | Huber | 359/179 |
| 5,617,434 A | 4/1997 | Tamura et al. | 372/6 |
| 5,623,508 A * | 4/1997 | Grubb et al. | 372/3 |
| 5,629,795 A | 5/1997 | Suzuki et al. | 359/337 |
| 5,659,351 A | 8/1997 | Huber | 348/7 |
| 5,659,559 A | 8/1997 | Ventrudo et al. | 372/6 |
| 5,659,644 A | 8/1997 | DiGiovanni et al. | 385/31 |
| 5,664,036 A | 9/1997 | Islam | 385/31 |
| 5,673,280 A | 9/1997 | Grubb et al. | 372/3 |
| 5,673,281 A | 9/1997 | Byer | 372/3 |
| 5,701,186 A | 12/1997 | Huber | 359/125 |
| 5,726,784 A | 3/1998 | Alexander et al. | 359/125 |
| 5,734,665 A | 3/1998 | Jeon et al. | 372/6 |
| 5,757,541 A | 5/1998 | Fidric | 359/341 |
| 5,768,012 A | 6/1998 | Zanoni et al. | 359/341 |
| 5,778,014 A | 7/1998 | Islam | 372/6 |
| 5,790,300 A | 8/1998 | Zediker et al. | 359/334 |
| 5,796,909 A | 8/1998 | Islam | 385/147 |
| 5,798,855 A | 8/1998 | Alexander et al. | 359/177 |
| 5,815,518 A | 9/1998 | Reed et al. | 372/6 |
| 5,825,520 A | 10/1998 | Huber | 359/130 |
| 5,831,754 A | 11/1998 | Nakano | 359/161 |
| 5,838,700 A * | 11/1998 | Dianov et al. | 372/6 |
| 5,841,797 A | 11/1998 | Ventrudo et al. | 372/6 |
| 5,847,862 A | 12/1998 | Chraplyvy et al. | 359/337 |
| 5,861,981 A | 1/1999 | Jabr | 359/341 |
| 5,880,866 A | 3/1999 | Stolen | 359/138 |
| 5,883,736 A | 3/1999 | Oshima et al. | 359/341 |
| 5,887,093 A * | 3/1999 | Hansen et al. | 385/27 |
| 5,905,838 A | 5/1999 | Judy et al. | 385/123 |
| 5,920,423 A | 7/1999 | Grubb et al. | 359/341 |
| 5,959,750 A | 9/1999 | Eskildsen et al. | 359/134 |
| 5,978,130 A | 11/1999 | Fee et al. | 359/341 |
| 6,008,933 A | 12/1999 | Grubb et al. | 359/341 |
| 6,043,927 A | 3/2000 | Islam | 359/332 |
| 6,052,393 A | 4/2000 | Islam | 372/6 |
| 6,069,718 A * | 5/2000 | Khaleghi | 398/27 |
| 6,081,366 A | 6/2000 | Kidorf et al. | 359/341 |
| 6,088,152 A | 7/2000 | Berger et al. | 359/334 |
| 6,101,024 A | 8/2000 | Islam et al. | 359/334 |
| 6,147,794 A | 11/2000 | Stentz | 359/334 |
| 6,151,160 A | 11/2000 | Ma et al. | 359/341 |
| 6,163,396 A * | 12/2000 | Webb | 359/332 |
| 6,163,636 A * | 12/2000 | Stentz et al. | 385/24 |
| 6,181,464 B1 | 1/2001 | Kidorf et al. | 359/334 |
| 6,191,854 B1 | 2/2001 | Grasso et al. | 359/124 |
| 6,191,877 B1 | 2/2001 | Chraplyvy et al. | 359/124 |
| 6,219,176 B1 | 4/2001 | Terahara | 359/341 |
| 6,236,496 B1 | 5/2001 | Yamada et al. | 359/341 |
| 6,236,498 B1 * | 5/2001 | Freeman et al. | 359/337.1 |
| 6,239,902 B1 | 5/2001 | Islam et al. | 359/334 |
| 6,239,903 B1 | 5/2001 | Islam et al. | 359/337 |
| 6,263,139 B1 | 7/2001 | Kawakami et al. | 385/123 |
| 6,289,151 B1 * | 9/2001 | Kazarinov et al. | 385/32 |
| 6,304,368 B1 * | 10/2001 | Hansen et al. | 359/334 |
| 6,310,716 B1 | 10/2001 | Evans et al. | 359/334 |
| 6,335,820 B1 | 1/2002 | Islam | 359/334 |
| 6,356,383 B1 | 3/2002 | Cornwell, Jr. et al. | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,404,964 B1 | 6/2002 | Bhagavatula et al. | 385/123 |
| 6,414,786 B1 | 7/2002 | Foursa | 359/334 |
| 6,417,959 B1 | 7/2002 | Bolshtyansky et al. | 359/334 |
| 6,437,906 B1 | 8/2002 | Di Pasquale et al. | 359/337.2 |
| 6,661,973 B1 * | 12/2003 | Huber et al. | 398/91 |
| 2002/0001123 A1 | 1/2002 | Miyakawa et al. | 359/334 |

FOREIGN PATENT DOCUMENTS

| | | |
|---|---|---|
| EP | 0 421 675 A2 | 4/1991 |
| EP | 0 554 714 A1 | 1/1993 |
| EP | 0 734 105 A2 | 3/1996 |
| EP | 0 903 876 A1 | 3/1999 |
| EP | 0 903 877 A2 | 3/1999 |
| EP | 0 936 761 A1 | 8/1999 |
| EP | 1 054 489 A2 | 11/2000 |
| EP | 1 180 860 A1 | 2/2001 |
| EP | 1 180 860 A1 | 2/2002 |
| JP | 0 9 197452 A | 7/1997 |
| WO | WO 98/20587 | 5/1998 |
| WO | 98/42088 A1 | 9/1998 |
| WO | WO 98/42088 * | 9/1998 |
| WO | 99/66607 A2 | 12/1999 |
| WO | 00/49721 A2 | 8/2000 |

OTHER PUBLICATIONS

Agrawal, Govind. Fiber-Optic Communication Systems. 2nd Edition. John Wiley & Sons. pp. 435-436. 1997.*
Weik, Martin. Fiber Optics Standard Dictionary. 3rd Edition. 1997.*
E.M. Dianov, "Raman fiber amplifiers," Fiber Optics Research Center at the General Physics Institute of the Russian Academy of Sciences, Moscow, Russia, 5 pages © 1999.
A.K. Srivastava, et al., "System Margin Enchancement with Raman Gain in Multi-Span WDM Transmission," Technical Digest, OFC '99, 3 pages. Friday, Feb. 26, 1999.
S.A.E. Lewis, et al., "1.4W saturated output power from a fibre Raman amplifier," OFC., 3 pages, OFC. 1999.
Hiroji Masuda and Shingo Kawal, Ultra Wide-Band Raman Amplification With A Total Gain-Bandwidth of 132 nm Of Two Gain-Bands Around 1.5 $\mu$m, ECOC'99, Nice, France, pp. II-146-II-147, Sep. 26-30, 1999.
Sugizaki, et al., Slope Compensating DCF for S-band Raman Amplifier, OSA TOPS vol. 60, Optical Amplifiers and Their Applications, Nigel Jolley, John D. Minelly, and Yoshiaki Nakano, eds., 2001 Optical Society of America, pp. 49-53, 2001.

Vasilyev, et al., Pump intensity noise and ASE spectrum of Raman amplification in non-zero dispersion-shifted fibers, reprinted from the Optical Amplifiers and Their Applications Conference, 2001 Technical Digest, 2001 Optical Society of America, pp. 57-59, 2001.

Sun, Y. et al., "80nm Ultra-Wideband Erbium-Doped Silicia Fibre Amplifier" Electronics Letters, Nov. 6, 1997, vol. 33, No. 23, pp. 1965-1967.

Wysocki, P.F. et al., "Broad-Band Erbium-Doped Fiber Amplifier Flattened Beyond 40nm Using Long-Period Grating Filter", IEEE Photonics, vol. 9, No. 10, Oct. 10, 1997, pp. 1343-1345.

Liaw, S-K et al., "Passive Gain-Equilized Wide-Band Erbium-Doped Fiber Amplifier Using Samarium-Doped Fiber", IEEE Photonics Technology: Letters, vol. 8, No. 7, Jul. 7, 1996, pp. 879-881.

Yamada, M. et al., "A Low-Noise and Gain-Flattened Amplifier Composed of a Silica-Based and a Fluoride-Based Er3+-Doped Fiber Amplifierin a Cascade Configuration", IEEE Photonics Letters, vol. 8, No. 5, May 1996, pp. 620-622.

Ma, M.X. et al., "240-km Repeater Spacing in a 5280-km WDM System Experiment Using 8x2.5 Gb/s NRZ Transmission", IEEE Photonics Technology Letters, vol. 10, No. 6, Jun. 1998, pp. 893-895.

Masuda, H. et al., "Ultrawide 75-nm 3-dB Gain-Band Optical Amplification with Erbium-Doped Fluoride Fiber Amplifiers and Distrbuted Raman Amplifiers", IEEE Photonics Technology Letters, vol. 10, No. 4, Apr. 1998, pp. 516-518.

Masuda, H. et al., "Wide-Band and Gain Flattened Hybrid Fiber Amplifier Consisting of an EDFA and a Multiwavelength Pumped Raman Amplifier", IEEE Photonics Technology Letters, vol. 11, No. 6, Jun. 1999, pp. 647-649.

Kawaii, S. et al., "Ultra-Wide, 75nm 3dB Gain-Band Optical Amplifier Utilising Gain-Flattened Erbium-Doped Fluoride Fibre Amplifier and Discrete Raman Amplification", Electronic Letters, vol. 34, No. 9, Apr. 30, 1998, pp. 897-898.

Kawai, S. et al., "Ultrawide, 75nm 3dB Gain-Band Optical Amplifier Utilizing Erbium-Doped Flouride fiber and Raman Fiber", OFC Technical Digest, 1998.

Kidorf, H. et al., "Pump Interactions in a 100-nm Bandwidth Raman Amplifier", IEEE Electronics Technology Letters, vol. 11, No. 5, May 1999, pp. 530-532.

Ono, H. et al., "Gain-Flattened Er3+-Doped Fiber Amplifier for a WDM Signal in the 1.57-1.60-$\mu$m Wavelength Region", IEEE Photonics Technology Letters, vol. 9, No. 5, May 1997, pp. 596-598.

Hansen, P.B. et al., "529km Unrepeatered Transmission at 2.488 Gbit/s Using Dispersion Compensation, Forward Error Correction, and Remote Post-and Pre-amplifiers Pumped By Diode-Pumped Raman Lasers", IEEE Electronics Letters Online No. 19951043, Jul. 7, 1998.

Guy, M.J. et al., "Lossless Transmission of 2ps Pulses Over 45km of Standard Fibre at 1.3$\mu$m Using Distributed Raman Amplification", Electronics Letters, vol. 34, No. 8, Apr. 6, 1998, pp. 793-794.

Dianov, E.M. et al., "Highly Efficient 1.3$\mu$m Raman Fibre amplifier", Electronics Letters, vol. 34, No. 7, Apr. 2, 1998, pp. 669-670.

Chernikov, S.V. et al., "Raman Fibre Laser Operating at 1.24$\mu$m", Electronics Letters, vol. 34, No. 7, Apr. 2, 1998, pp. 680-681.

Liaw, S-K et al., "Passive Gain-Equilized Wide-Band Erbium-Doped Fiber Amplifier Using Samarium-Doped Fiber", IEEE Photonics Technology Letters, vol. 8, No. 7, Jul. 1996, pp. 879-881.

Masuda, M. et al., "Wideband, Gain-Flattened, Erbium-Doped Fibre Amplifiers with 3dB Bandwidths of >50nm", Electronics Letters, vol. 33, No. 12, Jun. 5, 1997, pp. 1070-1072.

Yang, F.S. et al., "Demonstration of Two-Pump Fibre Optical Parametric Amplification", Electronics Letters, vol. 33, No. 21, Oct. 9, 1997, pp. 1812-1813.

Kawai, S. et al., "Wide-Bandwidth and Long Distance WDM Transmission Using Highly Gain-Flattened Hybrid Amplifier", IEEE Photonics Technology Letters, vol. 11, No. 7, Jul. 1999, pp. 886-888.

Paschotta, R. et al., "Ytterbium-Doped Fiber Amplifiers", IEEE Journal of Quantum Electronics, vol. 33, No. 7, Jul. 1997, pp. 1049-1056.

Chernikov, S.V. et al., "Raman Fibre Laser Operating at 1.24 $\mu$m" Electronics Letters, vol. 34, No. 7, Apr. 2, 1998, pp. 680-681.

Grubb, S.G. et al., "Fiber Raman Lasers Emit at Many Wavelengths", Laser Focus World, Feb. 1996, pp. 127-134.

Mollenauer, L.F. et al., "Dispersion-Managed Solitons for Terrestrial Transmission", Optical Society Of America, 1999.

Hansen, S. L. et al., "Gain Limit in Erbium-Doped Fiber Amplifiers Due to Internal Rayleigh Backscattering", IEEE Photonics Technology Letters, vol. 4, No. 6, Jun. 1992, pp. 559-561.

Spirit, D.M. et al., "Systems Aspects of Raman Fibre Amplifiers", Optical Amplifiers for Communication, vol. 137, Pt. J, No. 4, Aug. 1990, pp. 221-224.

Mollenenauer, L.F. et al., "Soliton Propagation in Long Fibers with Periodically Compensated Loss", IEEE Journal of Quantum Electronics, vol. QE-22, No. 1, Jan. 1986, pp. 157-173.

Marhic, M.E. et al., "Cancellation of Stimulated-Raman-Scattering Cross Talk in Wavelength-Division-Multiplexed Optical Communication Systems by Series or Parallel Techniques", Optical Society of America, 1998, vol. 15, No. 3, pp. 958-963.

Hansen, P.B. et al., "Rayleigh Scattering Limitations in Distrigbuted Raman Pre-Amplifiers", IEEE Photonics Technology Letters, vol. 10, No. 1, Jan. 1998, pp. 159-161.

Ikeda, M., "Stimulated Raman Amplification Characteristics in Long Span Single-Mode Silica Fibers", Optics Communications, vol. 39, No. 3, 1981, pp. 148-152.

Grandpierre, A.G. et al., "Theory of Stimulated Raman Scattering Cancellation in Vawelength-Division-Multiplexed Systems via Spectral Inversion", IEEE Photonics Technology Letters, Vol. 11, No. 10, Oct. 1999, pp. 1271-1273.

Chinn, S.R. "Analysis of Counter-Pumped Small-Signal Fibre Raman Amplifiers", Electronics Letters, vol. 33, No. 7, Mar. 27, 1997, pp. 607-608.

Stolen, R.H. et al., "Raman Gain in Glass Optical Waveguides", Appl. Phys. Lett. vol. 22, No. 6, Mar. 15, 1973, pp. 276-278.

Stolen, R.H. et al., "Development of the Stimulated Raman Spectrum in Single-Mode Silica Fibers", Optical Society of America, vol. 1 No. 4, Aug. 1984, pp. 662-667.

Nissov, M. et al., "100 Gb/s (10x10Gb/s) WDM Transmission Over 7200 km Using Distributed Raman Amplification", Center for Broadband Telecommunications, pp. 9-12.

Takachio, N. et al., "32x 10 Gb/s Distributed Raman Amplification Transmission with 50-GHz Channel Spacing in the Zero-Dispersion Region over 640km of 1.55-μm Dispersion-shifted Fiber", NTT LABS.

Pending Patent Application; U.S. Appl. No. 09/811,067, entitled "Method and System for Reducing Degredation of Optical Signal to Noise Ratio", filed Mar. 16, 2001

Pending Patent Application; U.S. Appl. No 09/811,103; entitled "System and Method for Wide Band Raman Amplification", filed Mar 16, 2001.

Pending Patent Application; U.S. Appl. No 09/916,454; entitled "System and Method for Controlling Noise Figure", filed Jul. 27, 2001.

Pending Provisional Patent Application; U.S. Appl. No. 60/310,147; entitled "Combined Laser Diode Raman Pumps; Active Gain Equalizers; Bi-Directional Raman Amplifiers", filed 05/00/2002.

Pending Patent Application; U.S. Appl. No. 10/100,588; entitled "Electro-Absorption Based Modulation", filed Mar. 15, 2002.

Pending Patent Application, U.S. Appl. No. 09/768367, entitled "All Band Amplifer", filed Jan. 22, 2001.

Pending Patent Application; U.S. Appl. No. 09/766, 489; entitled "Nonlinear Polarization Amplifiers in Nonzero Dispersion Shifted Fiber", filed Jan 19, 2001.

Pending Patent Application; U.S. Appl. No. 09/800,085; entitled "Dispersion Compensating Nonlinear Polarization Amplifier", filed Mar. 5, 2001.

Pending Patent Application; U.S. Appl. No. 09/760,201; entitled "Low-Noise Distributed Raman Amplifier Using Bi-Directional Pumping Using Multiple Raman Orders", filed Jan 12, 2001.

Pending Patent Application; U.S. Appl. No. 09/765,972; entitled "S+ Band Nonlinear Polarization Amplifiers". filed Jan. 19, 2001.

Pending Patent Application; U.S. Appl. No. 10/003,199; entitled "Broadband Amplifier and Communication System", filed Oct. 30, 2001.

Pending Patent Application; U.S. Appl. No. 10/007,643; entitled "Multi-Stage Optical Amplifier and Broadband Communication System", filed Oct. 30, 2001.

Pending Patent Application; U.S. Appl. No. 10/014,839; entitled "Multi-Stage Optical Amplifier and Broadband Communication System", filed Dec. 10, 2001.

Pending Patent Application; U.S. Appl. No. 09/990,142; entitled "Broadband Amplifier and Communication System", filed Nov. 20, 2001.

Pending Patent Application; U.S. Appl. No. 10/100,591; entitled "System and Method for Managing System Margin", filed Mar. 15, 2002.

Pending Patent Application; U.S. Appl. No. 10/100,587; entitled "Fiber Optic Transmission System with Low Cost Transmitter Compensation", filed Mar. 15, 2002.

Pending Patent Application; U.S. Appl. No. 10/116,487; entitled "Fiber Optic Transmission System for a Metropolitan Area Network", filed Apr. 3, 2002.

Pending Patent Application; U.S. Appl. No. 10/100,589; entitled "System and Method for Dispersion Compensation in an Optical Communication System", filed Mar. 15, 2002.

Pending Patent Application; U.S. Appl. No. 10/100,700; entitled "Rack System for an End Terminal in an Optical Communication Network", filed Mar. 15, 2002.

A.R. Chraplyvy et al., "Performance Degradation Due to Stimulated Raman Scattering in Wavelength-Division-Multiplexed Optical-Fibre Systems," Electronics Letters, vol. 19, No. 16, 3 pages, Aug. 4, 1983.

Hansen et al.; "Loss compensation in dispersion compensating fiber modules by Raman amplification," Optical Fiber Conference OFC'98, paper TuD1, Technical Digest, San Jose, CA, pp. 20-21, Feb. 1988.

Lee et al., "Bidirectional transmission of 40 Gbit/s WDM signal over 100km dispersion shifted fibre," Electronics Letters, vol. 34, No. 3, pp. 294-295 Feb. 5, 1998.

Okuno et al., "Generation of Ultra-Broad-Band Supercontinuum by Dispersion-Flattened and Decreasing Fiber," IEEE Phontonics Technology Letters, vol. 10, No. 1, pp. 72-74, Jan. 1998.

Rotwitt et al., "Distributed Raman Amplifiers for Long Haul Transmission systems," LEOS, pp. 251-252, Dec. 1998.

Grubb et al., "Detailed analysis of Raman amplifiers for long-haul transmission," OFC Technical Digest, pp. 30-31, 1998.

Kawai et al., "Ultrawide, 75-nm 3-dB gain-band optical amplifier utilizing erium-doped flouride fiber and Raman fiber," OFC Technical Digest, pp. 32-34, 1998.

Emori et al., "Less than 4.7 dB Noise Figure Broadband In-line EDFA with a Raman Amplified-1300 ps/nm DCF Pumped by Multi-channel WDM Laser Diodes," OSA Conference, paper PD3-1-5, Vail, CO, Jul. 1998.

Becker et al., "Erbium Doped Fiber Amplifiers Fundamentals and Technology," Academic Press, pp. 55-60, 1999.

Yun et al., "Dynamic Erbium-Doped Fiber Amplifier Based on Active Gain Flattening with Fiber Acoustooptic Tunable Filter," IEEE Photonics Technology Letters, vol. 11, No. 10, pp. 1229-1231, Oct. 1999.

Nissov et al, "Rayleigh crosstalk in long cascades of distributed unsaturated Raman amplifiers," Electronics Letters, vol. 35, No. 12, pp. 997-998, Jun. 10, 1999.

Mikkelsen et al., "160 Gb/s TDM Transmission Systems," ECOC, 4 pages, 2000.

Nielsen et al., "3.28 Tb/s (82×40 Gb/s) transmission over 3 × 100 km nonzero-dispersion fiber using dual C- and L-band hybrid Raman/Erbium-doped inline amplifiers," OFCC 2000, pp. 1229-1231, Mar. 7-10, 2000.

PCT, Written Opinion, International Preliminary Examining Authority, PCT/US02/01806, 6 pages, Mar. 10, 2003.

PCT, Notification of Transmittal of the International Saerch Report or the Declaration, PCT/US02/14196, 5 pages, Oct. 21, 2003.

EPO, Communication—Supplementary Partial European Search Report, 99930301.9-1234/US9913551, 4 pages, Apr. 8, 2005.

* cited by examiner

*Primary Examiner*—Bernarr E. Gregory
*Assistant Examiner*—Deandra M. Hughes
(74) *Attorney, Agent, or Firm*—Baker Botts L.L.P.

(57) ABSTRACT

An apparatus and method are described for combining optical amplification and dispersion compensation in a Raman amplifier. A Dispersion-Managing Raman Amplifier (DMRA) combines Raman amplification with dispersion compensation by selecting the length and dispersion of the gain fiber to balance the dispersion of the link. This gain fiber is also single-mode at the signal and pump wavelengths. The pumping level is adjusted to balance the losses from the gain fiber and transmission link, while the pumping configuration is selected to remain within the 3 dB loss length for the pumping light. When the amplifier is split into two segments, the two segments may be joined by an isolator, a gain equalization element, and/or an optical add/drop multiplexer. For WDM transmission systems based on dispersion-shifted fiber (DSF), operation in the "violet band" between 1430–1530 nm is based on Raman amplification. By using a DMRA, a dispersion and nonlinearity managed system can be implemented. In particular, 4WM does not phase match in such a system, and modulation instability is absent in the transmission link. Furthermore, gain equalization can be added to the DMRA by cascading one or two Mach-Zehnder frequency filters. The invention also includes a method for symmetrically adding channels below and above the C-band, the gain tilt within the C-band can be minimized. Therefore, a roughly equal number of channels should be placed in the short-wavelength S-band and the long-wavelength L-band to minimize the Raman energy exchange in the C-band. Also, whereas C- and L-bands can be amplified using erbium-doped fiber amplifiers, the S-band can use either discrete or distributed Raman amplifiers. To minimize the interaction between pumps for different bands, alternate band pumps can be spatially dispersed and/or cross-polarized. The distributed Raman amplification can be achieved by pumping the transmission line with discrete laser diodes or by a Raman oscillator.

26 Claims, 13 Drawing Sheets

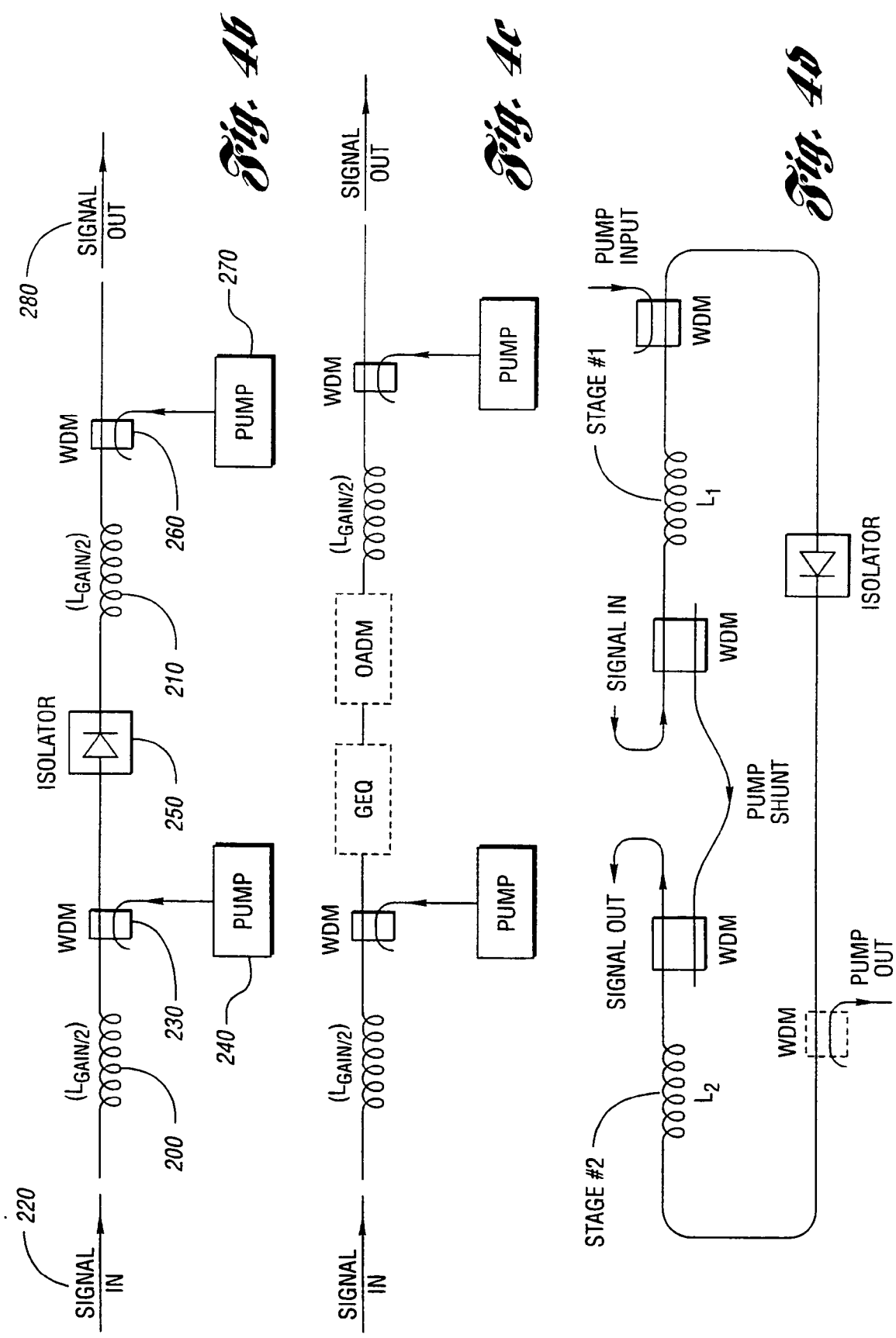

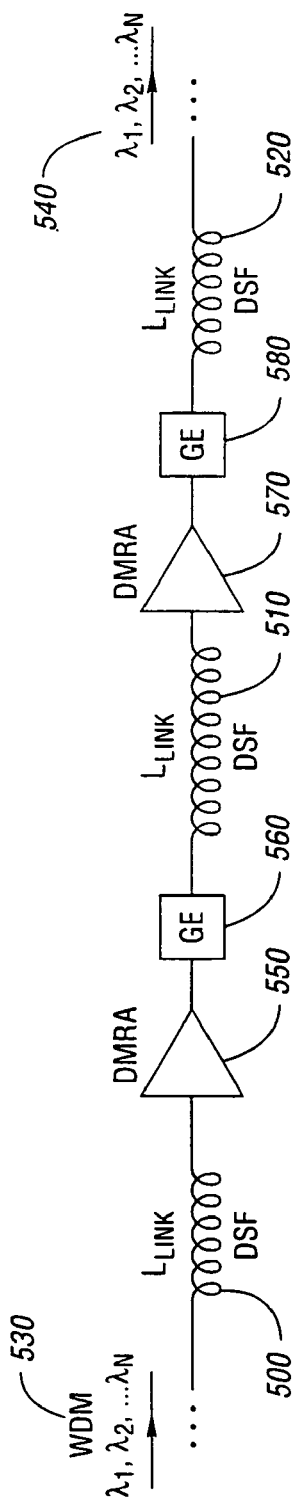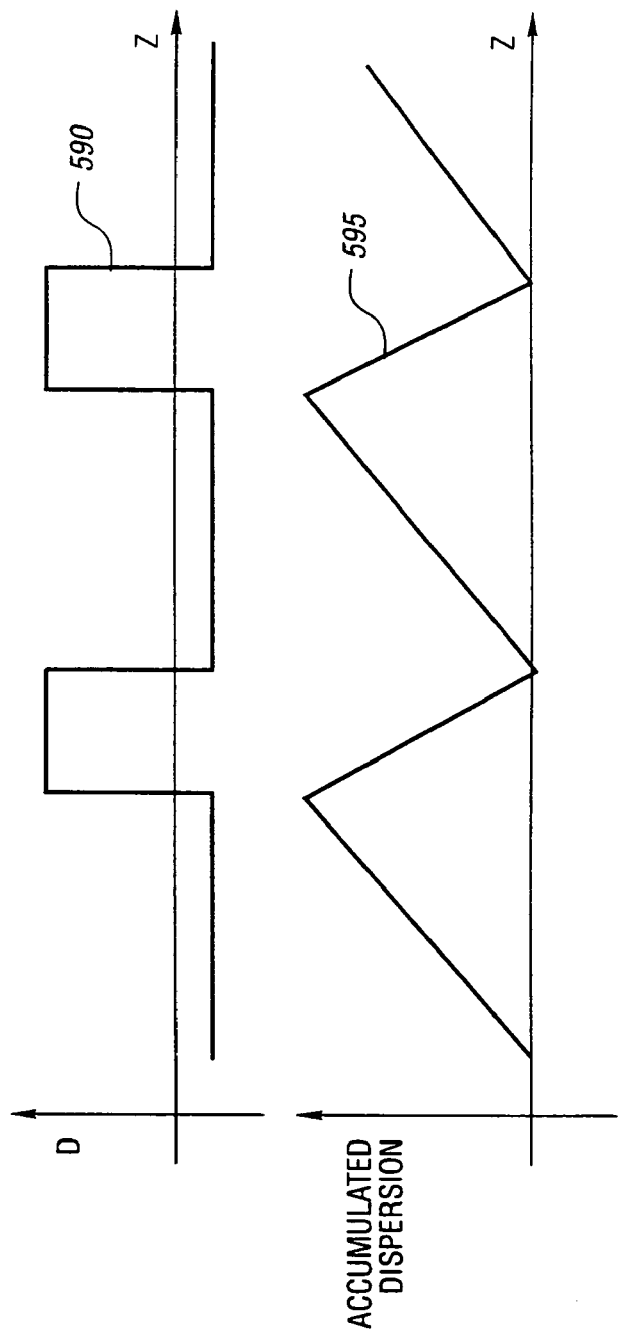

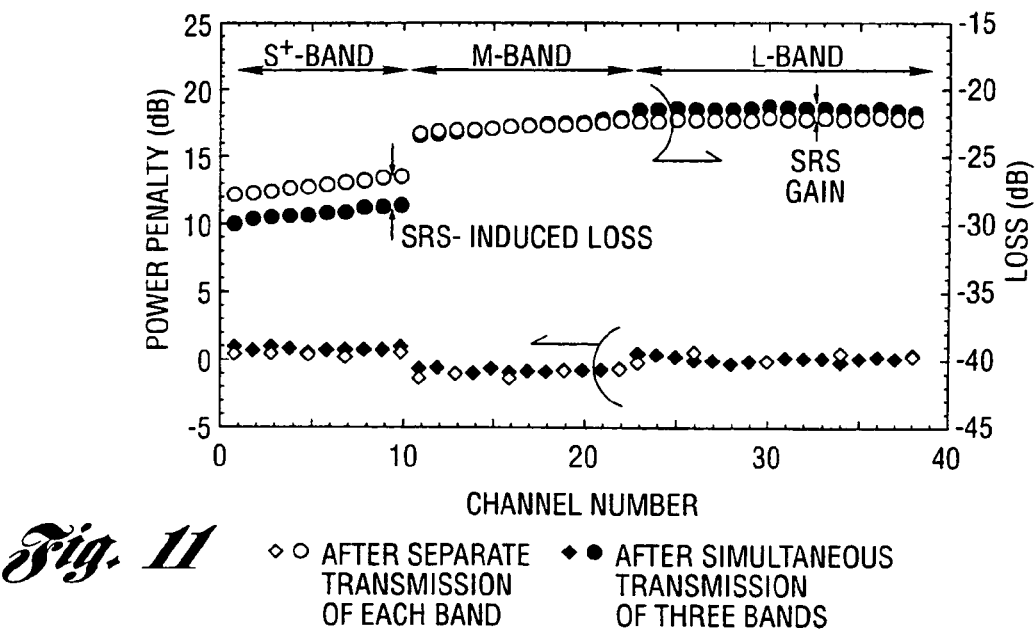
Fig. 11  ◇○ AFTER SEPARATE TRANSMISSION OF EACH BAND   ◆● AFTER SIMULTANEOUS TRANSMISSION OF THREE BANDS
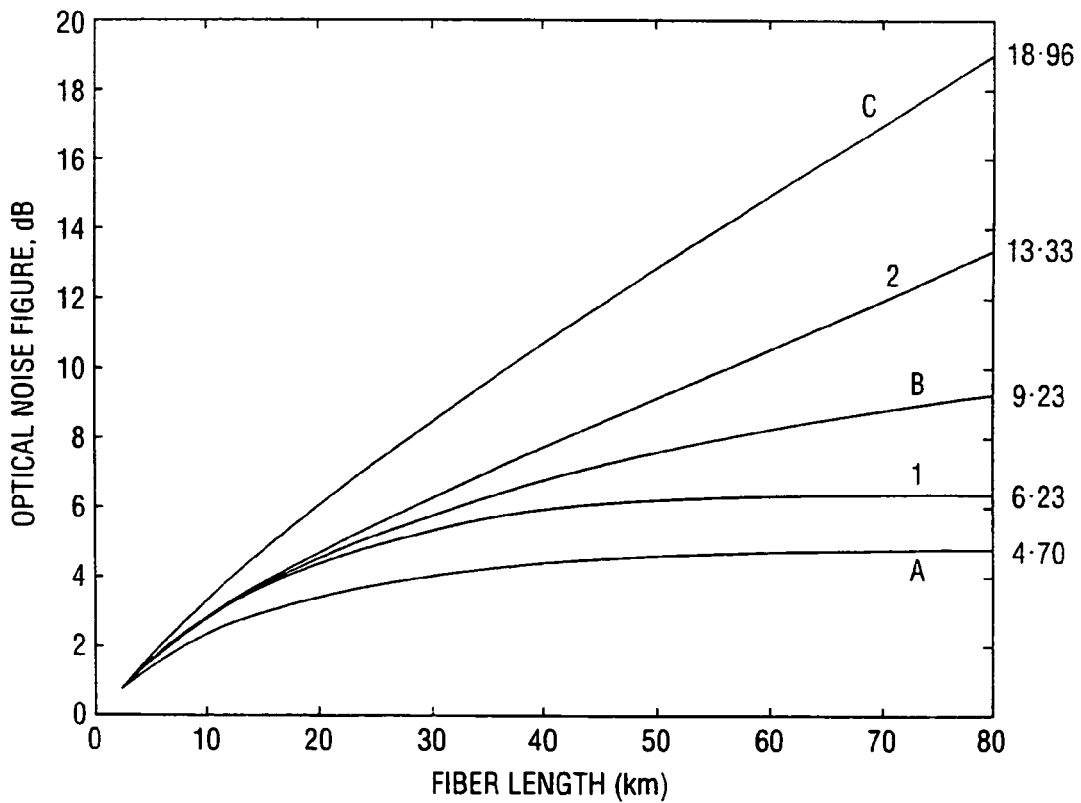
Fig. 12

FIBER-OPTIC COMPENSATION FOR DISPERSION, GAIN TILT, AND BAND PUMP NONLINEARITY

This application claims the benefit of Provisional Application No. 60/089,426 filed Jun. 16, 1998.

TECHNICAL FIELD

The present invention relates generally to optical amplifiers used in fiber-optics for telecommunications, cable television and other fiber-optics applications. More particularly, the invention relates an optical amplifier that also provides dispersion compensation for a fiber-optic link as well as methods for minimizing gain tilt and apparatus for minimizing non-linear interaction between band pumps.

BACKGROUND ART

The demand for bandwidth continues to grow exponentially on fiber-optic superhighways due to applications such as data communications and the internet. Consequently, there is much effort at exploiting the bandwidth of optical fibers by using higher speeds per channel—so-called time-division multiplexed systems—and multiple wavelengths of light—so-called wavelength-division multiplexing (WDM).

Most of the fiber-optic networks currently deployed use one of two kinds of fiber: standard single-mode fiber ("standard" fiber) or dispersion-shifted fiber (DSF). Standard fiber has a zero dispersion wavelength around 1310 nm, and the dispersion is primarily resulting from the inherent glass dispersion. Most of the terrestrial network in the US and most of the world is, in fact, based on standard fiber. In DSF, on the other hand, waveguide dispersion is used to shift the zero dispersion wavelength to longer wavelengths. A conventional DSF will have a zero dispersion wavelength at 1550 nm, coinciding with the minimum loss in a fused silica fiber. However, the zero dispersion wavelength can be shifted around by varying the amount of waveguide dispersion added. DSF is used exclusively in two countries, Japan and Italy, as well as in new long-haul links.

The limiting factors for a fiber-optic transmission line include loss, dispersion and gain equalization. Loss refers to the fact that the signal attenuates as it travels in a fiber due to intrinsic scattering, absorption and other extrinsic effects such as defects. Optical amplifiers, for example, can be used to compensate for the loss. Dispersion means that different frequencies of light travel at different speeds, and it comes from both the material properties and waveguiding effects. When using multi-wavelength systems and due the nonuniformity of the gain with frequency, gain equalization is required to even out the gain over the different wavelength channels.

The typical solution to overcoming these limitations is to place periodically in a transmission system elements to compensate for each of these problems. For example, FIG. 1 shows that a dispersion compensator 40 can be used to cancel the dispersion, an optical amplifier 50 can be used to balance the loss, and a gain equalization element 60 can be used to flatten the gain. Examples of dispersion compensators include chirped fiber gratings and dispersion compensating fiber (DCF). Examples of optical amplifiers include erbium-doped fiber amplifiers (EDFAs), Raman amplifiers, and non-linear fiber amplifiers (NLFAs). U.S. Pat. No. 5,778,014 discloses Sagnac Raman amplifiers and cascade lasers.

Finally, examples of gain equalizers include Mach-Zehnder interferometers and long period gratings. Rather than building a system out of these individual components, it may be easier and more cost effective to combine two or more of the functions in FIG. 1 into a single component as shown in U.S. Pat. No. 5,887,093.

Another problem that arises in WDM systems is interaction or cross-talk between channels through nonlinearities in the fiber. In particular, four-wave mixing (4WM) causes exchange of energy between different wavelength channels, but 4WM only phase matches near the zero dispersion wavelength. Consequently, if a fiber link is made from conventional DSF, it is difficult to operate a WDM system from around 1540–1560 nm. This turns out to be quite unfortunate because typical EDFA's have gain from 1535–1565 nm, and the more uniform gain band is near 1540–1560 nm. A second fiber nonlinearity that can be troublesome is modulation instability (MI), which is 4WM where the fiber's nonlinear index-of-refraction helps to phase match. However, MI only phase matches when the dispersion is positive or in the so-called soliton regime. Therefore, MI can be avoided by operating at wavelengths shorter than the zero dispersion wavelength.

As the bandwidth utilization over individual fibers increases, the number of bands used for transmission increases. For WDM systems using a number of bands, additional complexities arise due to interaction between and amplification in multi-band scenarios. In particular, particular system designs are needed for Raman amplification in multi-band transmission systems. First, a new nonlinearity penalty arises from the gain tilt from the Raman effect between channels. This arises because long wavelength channels tend to rob energy from the short wavelength channels. Therefore, a means of minimizing the gain tilt on existing channels with the addition of new WDM channels is required.

To minimize both the effects of 4WM and Raman gain tilt, another technical strategy is to use distributed Raman amplification. In a WDM system with multi-bands, a complexity arises from interaction between the different pumps along the transmission line.

U.S. Pat. No. 5,883,736 discloses an ER-Doped optical fiber amplifier.

U.S. Pat. No. 5,673,280 discloses an article comprising a low noise optical fiber Raman amplifier.

U.S. Pat. No. 5,623,508 discloses an article comprising a counter-pumped optical fiber Raman amplifier.

SUMMARY OF THE INVENTION

It is an object of the present invention to combine the dispersion compensation and optical amplifier functions through a single optical element such as a Raman amplifier where a gain fiber of the amplifier simultaneously performs the dispersion compensation.

It is another object of the present invention to provide different designs of the Raman amplifiers, depending on whether the fiber-optic link uses standard or DS fiber.

It is yet another object of the present invention to permit WDM systems over DS fiber links by using the "violet" band in Raman amplifiers with dispersion compensating fiber to avoid nonlinearity limitations from 4WM and MI.

It is another object of the present invention to minimize the effects of gain tilt on existing conventional bands by symmetric addition of bands below and above the existing bands. Whereas the longer wavelength channels can be amplified with erbium-doped fiber amplifiers, the shorter wavelength systems may advantageously be amplified with discrete or distributed Raman amplifiers.

Finally, it is yet another object of the present invention to avoid fiber nonlinear effects in dense WDM systems by using distributed Raman amplification. To avoid interaction between pumps in multi-band systems, means are described to orthogonalize adjacent band pumps to minimize interaction between pumps through Raman gain. Therefore, to reduce interaction between pumps for different bands, a means of multiplexing the pumps for different bands so they are orthogonal or non-overlapping in space, direction or polarization is provided.

In carrying out the above objects and other objects of the present invention in a fiber-optic transmission system including at least one transmission link having a length, optical loss, dispersion, a sign of dispersion and a cut-off wavelength, the invention includes a single optical element to compensate for the dispersion and to balance the optical loss. The optical element includes an input port for receiving an optical signal having a signal wavelength, a distributed gain medium having an optical loss and connected to the input port to amplify the optical signal, and a pumping mechanism having a pump wavelength for generating a pumping light to pump the distributed gain medium at a pumping level sufficiently high so that the optical signal experiences a net gain to compensate for the optical losses of the transmission link and the gain medium. The optical element further includes an output port for outputting the amplified optical signal.

The distributed gain medium is typically a gain fiber having a length, dispersion and a sign of dispersion. The gain fiber has a dispersion-length product substantially equal in magnitude to a dispersion-length product of the at least one transmission link but of opposite sign. Also, the gain fiber has a cut-off wavelength shorter than the pump wavelength so that the gain fiber is single spatial mode for both the pump wavelength and the signal wavelength.

The optical signal may be amplified in an open loop fashion.

The pumping mechanism may be at least one laser diode, a Raman oscillator or a Raman wavelength shifter.

In one embodiment, the gain fiber is pumped bi-directionally by the pumping mechanism.

In another embodiment the gain fiber has two separate segments and wherein the pumping mechanism pumps the two segments in a counter-propagating fashion.

The invention may further include an isolator, a gain equalization element and/or an optical add/drop multiplexer to connect the two segments.

In yet another embodiment a pump shunt is coupled to the input and output ports to shunt the pumping mechanism wherein the gain fiber has separate first and second segments separated by the input and output ports and wherein the pumping mechanism pumps the first segment in a counter-propagating fashion and then pumps the second segment to deplete power of the pumping mechanism.

The optical signal may also be amplified in a closed loop fashion.

The gain fiber may at least partially defines a broadband cavity which is pumped bi-directionally by the pumping mechanism. In this case, the gain fiber may be a Raman gain fiber and the broadband cavity may be a Sagnac Raman cavity.

In another embodiment, the distributed gain median includes a circular loop cavity with chirped Bragg gratings and wherein the gain fiber has two separate segments which are pumped in a counter-propagating fashion by the pumping mechanism.

When the transmission line is a multi-wavelength transmission line having non-uniform gain over different wavelength channels, a second optical element may be provided for evening the non-uniform gain over the different wavelength channels. The second optical element includes at least one stage of Mach-Zehnder interferometers. The distributed gain mechanism may be a gain fiber having two separate segments and wherein the second optical element connects the two segments.

In a transmission system which operates in a violet band between 1430 and 1530 nm wherein the at least one transmission link includes a DSF having at least one fiber non-linearity effect and a zero dispersion wavelength, the single optical element provides gain in the violet band sufficiently far from the zero dispersion wavelength to avoid the at least one fiber non-linearity effect in the at least one link. The gain fiber may be a standard dispersion fiber.

The at least one fiber non-linearity may be four-wave mixing and/or modulation instability.

The at least one transmission link may have non-uniform gain over different wavelength channels and the invention further includes a second optical element connected to the single optical element for evening the non-uniform gain over the different wavelength channels. The second optical element may include at least one stage of Mach-Zehnder interferometers.

The gain fiber may be a dispersion compensating fiber selected so that accumulated dispersion is balanced at substantially the middle of the violet band.

Further in carrying out the above objects and other objects of the present invention, in a fiber-optic multi-band system including a multi-wavelength transmission line, a method is provided for minimizing gain tilt within at least one existing band of wavelengths as additional bands of wavelengths are added. The method includes adding a substantially equal number of additional bands both above and below the at least one existing band of wavelengths to obtain shorter and longer wavelength bands to minimize energy change in the at least one existing band of wavelengths. The method also includes amplifying the shorter and longer wavelength bands so that each of the shorter and longer wavelength bands has a gain.

The step of amplifying the shorter wavelength band may be accomplished with either discrete or distributed Raman amplifiers.

The step of amplifying the longer wavelength bands may be accomplished with Erbium-doped fiber amplifiers. The gain in at least one of the shorter wavelength bands is greater than the gain in at least one of the longer wavelength bands.

The step of amplifying the shorter wavelength bands may be done in a distributed fashion.

Still further in carrying out the above objects and other objects of the present invention in a fiber-optic multi-band transmission system including a multi-wave transmission line, an apparatus is provided. The apparatus includes a plurality of band pumps for pumping different bands of the transmission line to obtain amplification wherein band pumps for different bands interact non-linearly by exchanging energy. The apparatus also includes means for orthogonalizing adjacent band pumps to minimize the non-linear interaction.

The amplification may be distributed Raman amplification and the energy is Raman energy.

Alternate band pumps may be spatially dispersed to minimize interaction between band pumps for the different bands.

Alternate band pumps may be cross-polarized to minimize interaction between band pumps for the different bands.

The plurality of band pumps may define a purely distributed system of distributed Raman amplifiers.

Alternatively, the plurality of band pumps may define a hybrid system of discrete and distributed amplifiers.

The plurality of band pumps may include discrete laser diodes or a Raman oscillator for pumping the transmission line.

In accordance with the invention, a Dispersion Managing Raman Amplifier (DMRA) is implemented using gain fiber that also serves as a dispersion compensator. The fiber should be single-mode for both the pump and signal wavelengths, so that the cut-off wavelength should be shorter than the pump wavelength. The length and dispersion of the fiber should be selected to have ideally the same magnitude of dispersion-length product as the transmission link, but with the opposite sign of dispersion. The pumping level should be selected to provide gain that is larger than the sum of losses from the dispersion-compensating fiber and the transmission link. Also, the pumping scheme should be selected to stay within the 3 dB loss length for the pumping light.

In one embodiment, a dispersion-compensating fiber (DCF) with a large negative dispersion (e.g., D<−80 psec/nm-km) is used to compensate for the dispersion of a link using standard fiber. If the fiber link is 45 km long, then the DCF should be about 7.8 km long for dispersion compensation at 1500 nm. Also, the gain should exceed 14.2 dB, and the gain fiber may need to be pumped either bi-directionally or in two segments.

In another embodiment, a standard fiber is used to compensate for the dispersion of a link using conventional DS fiber and operating in the "violet band." If the fiber link is 45 km long, then the standard gain fiber should be about 13.3 km long for dispersion compensation at 1500 nm. Again, the gain should exceed 14.2 dB, and the gain fiber may need to be pumped either bi-directionally or in two segments.

In the embodiments where the gain fiber is separated into two segments, a number of elements can be used to connect the two segments. The simplest is to insert an isolator, so as to avoid interaction between the two pumps. Alternately, a gain equalization element or an optical add/drop multiplexer may be placed at the joining point between the two segments.

The present invention also relates to implementing a dispersion and nonlinearity managed fiber optic system that uses DS fiber in the transmission links. For multiple-wavelength WDM systems, operation is desired in the "violet band" between 1430–1530 nm to avoid wavelengths in close proximity to the zero dispersion wavelength in conventional DSF. Gain is provided by a Raman amplifier, and the gain fiber also simultaneously provides for dispersion compensation. The fiber nonlinearities are managed because 4WM does not phase match away from the zero dispersion wavelength, and MI is avoided because the transmission fiber operates in the normal dispersion (i.e., D<0) regime.

Combining the amplification and dispersion compensation elements simplifies the system implementation and is more cost-effective for a Raman amplifier. Additionally, gain equalizing elements comprising one or two stages of Mach-Zehnder interferometers can be used to flatten the gain band in Raman amplifiers. Also, there is a growing interest in dispersion-managed systems that alternate between positive and negative dispersion segments with an average dispersion of zero across the link. This interest spans virtually every data format, including non-return to zero, return-to-zero and solitons. The Raman amplifiers using dispersion compensating fiber naturally lead to dispersion and nonlinearity managed systems.

Additionally, in accordance with the invention, the gain tilt changes across the currently used conventional bands can be minimized by adding channels in the long-wavelength band in roughly equal number to channels in the short wavelength band. The rough symmetric (channel number wise) channel addition balances Raman energy exchange in the conventional band. Whereas the conventional and long-wavelength bands can use erbium-doped fiber amplifiers the short wavelength band can be amplified by discrete or distributed Raman amplifiers.

Finally, the present invention also relates to distributed Raman amplification with multiple-bands. In multi-band distributed systems, the nonlinear interaction between pumps for different bands can be minimized by spatially dispersing alternate band pumps and/or by cross-polarizing alternate pump bands. The distributed Raman amplification can be achieved by pumping the transmission line with discrete laser diodes or by a Raman oscillator.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 4(a)–4(f) are schematic views which depict open loop configurations for the DMRA; in FIG. 4(a), a bi-directionally pumped gain fiber is used, while in FIG. 4(b) the gain fiber is split in two parts and the configuration is counter-propagating for the pump and signal; as an alternative to FIG. 4(b), FIG. 4(c) shows that other elements such as gain equalization filters or optical add/drop multiplexers may be placed between the two segments of the amplifier; FIG. 4(d) illustrates an improved two-stage amplifier, where the pump is inserted into the first stage counter-propagating and then sent to the second stage of the amplifier; FIG. 4(e) shows another version of the two-stage design of FIG. 4(d) with mid-stage elements such as optical add/drop multiplexers; and FIG. 4(f) shows a further modification of the basic design in FIG. 4(d), where bi-directional pumping is used in the second stage to boost the power gain without severe degradation in noise figure for the composite amplifier;

FIG. 8(a) is a schematic view and FIGS. 8(b) and 8(c) are graphs which depict an exemplary dispersion-managed WDM transmission system where the transmission fiber is based on DS fiber; as an example, the Raman gain fiber can be standard dispersion fiber; in addition, for multiple-wavelengths gain equalizers can be placed periodically with the amplifiers;

FIG. 11 is a graph which depicts the power penalty in different bands when each band is launched separately and when all three bands are lauched together (after J. Kani, K. Hattori, M. Jinno, S. Aisawa, T. Sakamoto and K. Oguchi, "Trinal-wavelength-band WDM transmission over dispersion-shifted fiber," presented at Optical Fiber Communications Conference OFC'99, San Diego, Calif., February 1999, contributed paper WJ-2);

FIG. 12 is a graph which depicts the calculated optical noise figure versus fiber length for different cases; both the pump and signal attenuation is assumed to be 0.2 dB/km in the fiber; (A) amplifier followed by fiber, (B) uniformly distributed amplifier, (C) fiber followed by amplifier, (1) forward pumped Raman amplifier, and (2) backward pumped Raman amplifier;

FIGS. 15a–15d are schematic views which depict hybrid systems consisting of discrete and distributed amplifiers; in FIG. 15(a) distributed amplification is added with only counter-propagating Raman pumps and assuming that access at the mid-point stage exists; alternate band pumps are added at different spatial points to minimize nonlinear interaction between pumps; in FIG. 15(b) mid-span access is not available but bi-directional pumping is allowed, then this configuration can be used where alternate band Raman pumps are launched in different directions to minimize interaction between pumps; in FIG. 15(c) bi-directional pumping is allowed and mid-stage access is also available, then a more uniform pumping can be achieved using this scheme; in FIG. 15(d) only counter-propagating pumps are allowed and there is no mid-stage access, then the alternate pump bands can be launched orthogonally polarized; the polarization multiplexing of FIG. 15 (d) can also be combined advantageously with any of the other schemes of FIGS. 15(a)–(c); in FIG. 16(a) a purely counter-propagating pumping scheme is shown where mid-stage access exists and the alternate pump bands are spatially dispersed in this case; in FIG. 16(b) a bi-directionally pumped situation is shown with no mid-stage access, where alternate pumps are launched in different directions; FIG. 16(c) the combination of bi-directional pumping plus mid-stage access is shown to make the gain more spatially uniform; in FIG. 16(d) launch of alternate pump bands cross-polarized is shown; the cross-polarized pumps of FIG. 16(d) can be advantageously combined with any of the configurations in FIG. 16(a)–(c).

DETAILED DESCRIPTION OF PREFERRED EMBODIMENTS

Figure 1:
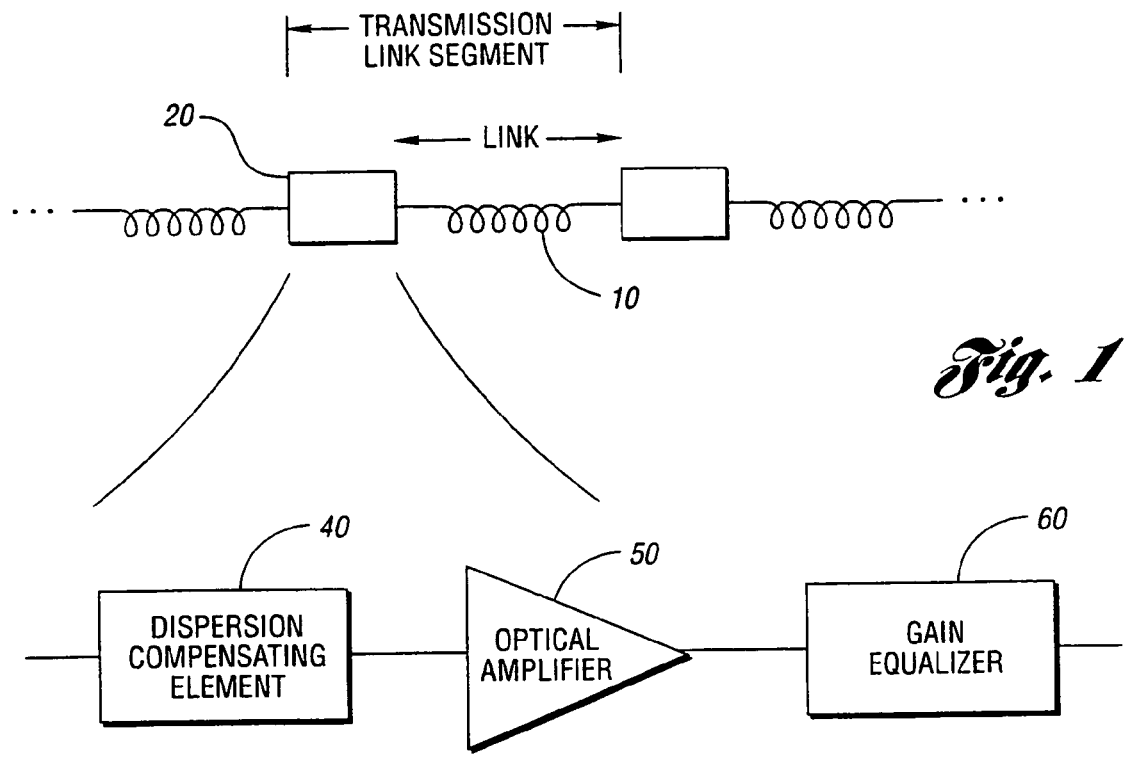
FIG. 1 is a schematic view which depicts a typical transmission system, where periodically within the link elements are inserted components that provide dispersion compensation, optical amplification and gain equalization.

The present invention combines the functions of optical amplification and dispersion compensation advantageously to simplify the implementation of dispersion managed systems. The DMRA uses Raman amplification in a fiber that dispersion compensates for the surrounding transmission link.

More specifically, the DMRA of the invention comprises an input port for inputting an optical signal having a wavelength $\lambda$, a distributed gain medium for receiving the optical signal and amplifying and spectrally broadening the same therein through Raman scattering, a pumping means operated at wavelength $\lambda_p$ for generating a pumping light to pump the distributed gain medium, and an output port for outputting the amplified and spectrally broadened optical signal. The dispersion and length of the distributed gain medium is selected to be of the same magnitude of dispersion-length product as the transmission link but of the opposite sign of dispersion. The fiber is made single spatial mode for the pump and signal wavelengths by making the cut-off wavelength of the gain fiber shorter than $\lambda_p$. Also, the amplifier is pumped so the net gain exceeds the sum of losses in the transmission link and the dispersion compensating fiber.

A first embodiment of the DMRA uses open-loop amplification with an optical fiber gain medium. A pump source is used, where the fiber is either bi-directionally pumped or pumped in two segments connected through an isolator. Alternately, the two gain segments can be connected through a gain equalization element and/or an optical add/drop multiplexer. A second embodiment of the DMRA uses a Sagnac Raman cavity that is pumped and uses the dispersion compensating fiber within the loop. Feedback in the Sagnac Raman cavity reduces the required pump power, and the broadband cavity design supports much of the generated bandwidth. Also, the Sagnac Raman design automatically achieves the bi-directional pumping. A third embodiment of the DMRA amplifier uses a circulator loop cavity with chirped Bragg gratings, where the fiber is pumped in two parts to retain a strictly counter-propagating pumping scheme. The gain fiber length and dispersion in all of these embodiments depends on whether the transmission link uses standard or DS fiber.

The present invention also relates to a dispersion and nonlinearity managed system where the transmission links consist of DSF. To achieve a multiple-wavelength WDM system, operation is chosen to be in the "violet" band between 1430–1530 nm, thus avoiding the wavelength region surrounding the zero dispersion wavelength. A DMRA is used where the gain fiber also does dispersion compensation. The local dispersion is not small at any point within the fiber link, although the average dispersion over the entire link is adjusted to be approximately zero. Thus, the 4WM penalty is removed since 4WM does not phase match. Also, since operation is in the normal dispersion regime of the transmission fiber, MI also does not phase match.

The present invention also relates to minimizing the gain tilt across the existing conventional bands by symmetric addition (number wise) of channels at longer and shorter wavelengths to the existing band. By adding wavelengths in the long-wavelength L-band symmetrically with the short-wavelength S-band, the energy change in the conventional C-band can be minimized. The C-band and L-band can be amplified with erbium-doped fiber amplifiers, while the S-band can use discrete or distributed Raman amplifiers. The gain in the S-band must be greater than the gain in the C-band, and likewise the C-band may require more gain than the L-band.

In addition, the present invention relates to using distributed Raman amplification in multi-band systems to reduce the nonlinear fiber propagation effects. In broadband distributed Raman amplification, the nonlinear interaction between pumps for different bands can be minimized by spatially dispersing alternate band pumps and/or by cross-polarizing alternate pump bands. The orthogonalizing of adjacent band pumps can be done in purely distributed systems or hybrid discrete/distributed systems.

To provide a better understanding of the amplification mechanisms and nonlinearities at work in the present invention, we first describe stimulated Raman scattering, Raman cascading, MI and 4WM. Stimulated Raman scattering effect, MI and 4WM are the result of third-order nonlinearities that occur when a dielectric material such as an optical fiber is exposed to intense light. The third-order nonlinear effect is proportional to the instantaneous light intensity.

1. Stimulated Raman Scattering

Figure 2:
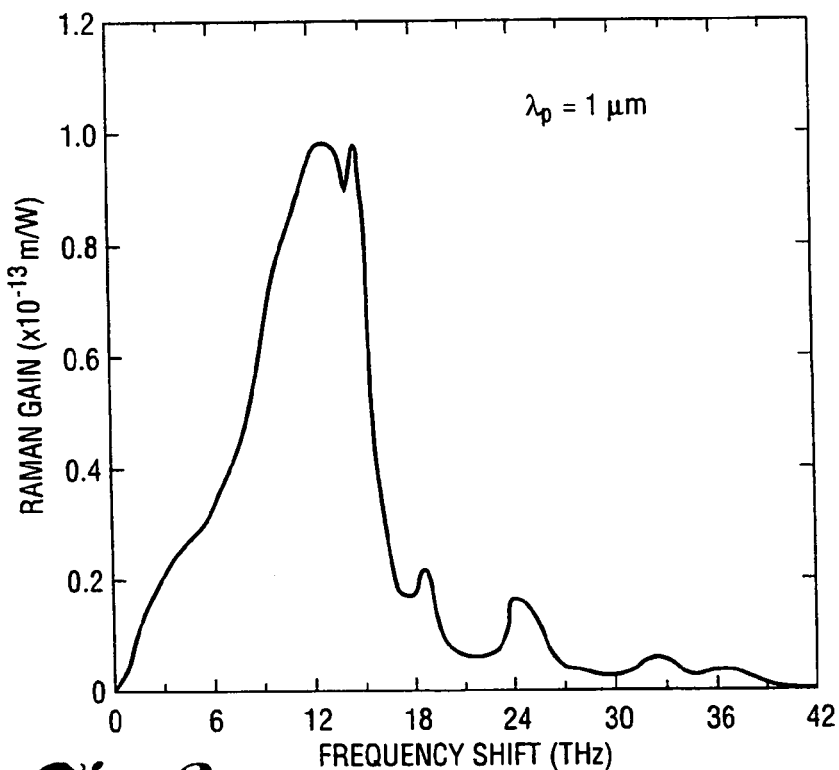
FIG. 2 is a graph which depicts the measured Raman gain spectrum for fused silica at a pump wavelength of 1000 nm.

Stimulated Raman scattering is an important nonlinear process that turns optical fibers into amplifiers and tunable lasers. Raman gain results from the interaction of intense light with optical phonons in silica fibers, and Raman effect leads to a transfer of energy from one optical beam (the pump) to another optical beam (the signal). The signal is downshifted in frequency (or upshifted in wavelength) by an amount determined by vibrational modes of silica fibers. The Raman gain coefficient $g_r$ for the silica fibers is shown in FIG. 2. Notably, the Raman gain $g_r$ extends over a large frequency range (up to 40 THz) with a broad peak centered at 13.2 THz (corresponding to a wavelength of 440 cm$^{-1}$). This behavior over the large frequency range is due to the amorphous nature of the silica glass and enables the Raman effect to be used in broadband amplifiers. The Raman gain also depends on the composition of the fiber core and can vary with different dopant concentrations.

Raman amplification has some attractive features. First, Raman gain is a good candidate for upgrading existing fiber optic links because it is based on the interaction of pump light with optical phonons in the existing fibers. Second, there is no excessive loss in the absence of pump power, other than the loss of the fiber inserted—an important consideration for system reliability.

2. Raman Cascading

Cascading is the mechanism by which optical energy at the pump wavelength is transferred, through a series of nonlinear polarizations, to an optical signal at a longer wavelength. Each nonlinear polarization of the dielectric produces a molecular vibrational state corresponding to a wavelength that is offset from the wavelength of the light that produced the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders. Because the Raman gain profile has a peak centered at 13.2 THz in silica fibers, one Raman order can be arranged to be separated from the previous order by 13.2 THz.

Cascading makes stimulated Raman scattering amplifiers very desirable. Raman amplification itself can be used to amplify multiple wavelengths (as in wavelength division multiplexing) or short optical pulses because the gain spectrum is very broad (a bandwidth of greater than 5 THz around the peak at 13.2 THz). Moreover, cascading enables Raman amplification over a wide range of different wavelengths. By varying the pump wavelength or by using cascaded orders of Raman gain, the gain can be provided over the entire telecommunications window between 1300 nm and 1600 nm.

3. Modulational Instability and Four-Wave Mixing

MI/4WM involve two pump (P) photons that create Stokes (S) and anti-Stokes (A) photons. Both MI/4WM and Raman amplification arise from the third order susceptibility $\chi^{(3)}$ in optical fibers. More specifically, the real part of $\chi^{(3)}$, the so-called nonlinear index of refraction $n_2$, is responsible for MI/4WM, while the imaginary part of $\chi^{(3)}$ associated with molecular vibrations corresponds to the Raman gain effect. In silica fibers, about ⅘ths of the $n_2$ is an electronic, instantaneous nonlinearity caused by ultraviolet resonances, while about ⅕th of $n_2$ arises from Raman-active vibrations, e.g., optical phonons (see further description in M. N. Islam, Ultrafast Fiber Switching Devices and Systems, Cambridge University Press, 1992). The imaginary part of this latter contribution corresponds to the Raman gain spectrum of FIG. 2.

Just as in Raman amplification, MI/4WM gain is present in every fiber. However, unlike the Raman effect, both MI and 4WM require phase-matching. 4WM is usually unimportant in long fibers due to the requirement for phase-matching, unless operation is near the zero dispersion wavelength. However, MI can act as self-phase-matched because the nonlinear index of refraction is used to phase match the pump and sidebands. This is particularly true when operating near the zero dispersion wavelength in fibers. In 4WM, sidebands are generated without gain when the signal wavelength falls in the normal dispersion regime (where the signal wavelength is shorter than the zero-dispersion wavelength). MI is 4-photon amplification or parametric amplification in which the nonlinear index of refraction is used to phase match the signal and sidebands. For MI the pump wavelength must lie in the anomalous group velocity regime (i.e., where the signal wavelength is longer than the zero dispersion wavelength) and proper phase matching requires that signal and side-bands be co-propagating.

4. Dispersion and Nonlinearity Managed Transmission Systems

Until recently, the conventional wisdom was that the maximum system bandwidth occurred for operation around the zero dispersion wavelength in the fiber. However, for WDM systems this thinking turns out to be wrong when nonlinearities are taken into account. When the system is operated at or near the fiber's zero dispersion wavelength, the signals in adjacent wavelength channels and the amplifier noise travel at similar velocities. Under these conditions, the multiple-wavelength signals and noise have long interaction lengths and can mix.

Chromatic dispersion causes different wavelengths to travel at different group velocities in the transmission fiber. Chromatic dispersion can reduce phase matching, or the propagation distance over which closely spaced wavelengths overlap, and can reduce the amount of interaction through the nonlinear index in the fiber. Thus, in a long transmission system, the nonlinear behavior can be managed by tailoring the dispersion accumulation so that the phase matching lengths are short and the end-to-end dispersion is small. This technique is known as dispersion mapping (for more details, see Chapters 8 and 10 in *Optical Fiber Telecommunications IIIA*, edited by I. P. Kaminow and T. L. Koch, Academic Press, 1997).

In dispersion mapping, dispersion compensating elements are inserted periodically in the transmission line to undo accumulated dispersion. By using a DMRA, the periodicity of the dispersion compensation would coincide with the periodicity of the amplifier spacing. Note that for WDM systems that the accumulated dispersion returns to zero for only one wavelength near the average zero dispersion wavelength for the transmission line. This differing accumulated dispersion for the WDM channels results from the nonzero slope of the dispersion curve. This can only be avoided if the dispersion compensating element has the opposite sign of dispersion slope (not just opposite sign of dispersion) from the transmission fiber. Except in this case, to minimize signal dispersion the accumulated dispersion for the channels away from the balance wavelength can be compensated for with the opposite dispersion at the receiver.

5. Dispersion Managed Raman Amplifiers

DMRA's combine the amplification and dispersion compensating functions by using a dispersion compensating fiber as the gain fiber in a Raman amplifier. The cut-off wavelength of the gain fiber must be adjusted to be shorter than the pump wavelength, so that the pump and signal are single mode. By operating away from the zero dispersion wavelength of the transmission fiber and the gain fiber, dispersion and nonlinearity management is achieved since 4WM does not phase match.

The key to the invention is the appropriate selection of the gain fiber characteristics. In particular, the fiber used in the Raman amplifier is chosen so that the dispersion at the mean optical wavelength times the length of the amplifying fiber $(D \times L)_{GAIN}$ compensates approximately (preferentially within 10% of the magnitude of the peak accumulated dispersion value) the dispersion accumulated in the link. In other words, $$(D \times L)_{GAIN} \approx -(D \times L)_{LINK}$$

This implies several things:

The sign of the dispersion for the amplifying fiber is opposite to that of the transmission link fiber.

The value of dispersion D in the amplifying fiber is determined by the operating wavelength and the zero dispersion wavelength in the gain fiber.

The length of the fiber can then be adjusted to provide the desired dispersion compensation.

If the transmission fiber is standard fiber, then the gain fiber can potentially lead to efficient Raman gain. This is because so-called DCF (or large negative dispersion fiber) typically has a small core size and effective area and significant germanium content in the core, both of which contribute to a larger Raman effect.

The only requirement is that the overall or average dispersion-times-length value over a transmission link segment be balanced. In other words, if desired, different fiber segments can be concatenated within the Raman amplifier to achieve the dispersion compensation.

Since the Raman gain is a nonlinear process that depends on the pump intensity, it is also important to understand that gain is achieved only while the pump intensity remains high. For example, the effective length for Raman amplification is defined as $$L_{eff} = \frac{1}{\alpha}[1 - \exp(-\alpha L)]$$

where L is the physical length of the fiber and $\alpha$ is the attenuation constant (typical units inverse meters or inverse kilometers). The attenuation constant given in dB/km is related to this attenuation constant by $$\alpha[dB/km] = 4.34 \times \alpha[km^{-1}]$$

Therefore, the effective length for Raman gain is approximately the distance where the pump intensity drops to half of its intensity at the fiber input. If the net loss at the pump wavelength is around 6–7 dB, then the Raman gain can still be achieved by bi-directionally pumping the fiber or by splitting the fiber in two halves and pumping each half.

Finally, for proper loss compensation, the pump power applied to the Raman amplifier must be adequate to make up for the transmission link loss, the gain fiber loss and any associated coupler or splitter losses. For example if the net gain is given by G and the losses are represented as attenuation factors aL, then $$G[dB] \geq \alpha L_{LINK}[dB] + \alpha L_{GAIN\ FIBER}[dB] + \alpha L_{COUPLING\ \&\ SPLITTING}[dB].$$

6. Exemplary Designs of DMRA's for Standard and DS Fiber

To illustrate the concepts of DMRA, we select exemplary system designs in transmission systems using both standard and DS fiber. To be specific, the following assumptions are made regarding wavelength, link fibers, amplifier spacing, and gain fibers in the Raman amplifiers.

Wavelength. Raman amplifiers are being developed for the violet band, which spans 1430–1530 nm. In particular, the blue-violet band is from 1430–1480 nm, while the red-violet band is from 1480–1530 nm. As a specific example, the wavelength of $\lambda=1500$ nm will be used in the following examples, which falls near the middle of the red-violet band.

Dispersion for standard single-mode fiber. The standard fiber used is assumed to be Corning SMF-28, for which the manufacturer provides the dispersion as:

$$D(\lambda) \approx \frac{S_0}{4}\left\{\lambda - \frac{\lambda_0^4}{\lambda^3}\right\}[\text{ps/nm-km}] \text{ for } 1200 \leq \lambda \leq 1600 \text{ nm}$$

$\lambda_0 \approx 1310$ nm [nominal]
$S_0 \leq 0.092$ ps/nm$^2$-km
At $\lambda = 1500$ nm, $D \approx -14.4$ ps/nm-km
Dispersion for DS fiber. The DSF used is assumed to be Corning SMF/DS, for which the manufacturer provides the dispersion as:

$$D(\lambda) \approx S_0\{\lambda - \lambda_0\}[\text{ps/nm-km}] \text{ for } 1500 \leq \lambda \leq 1600 \text{ nm}$$

Figure 3:
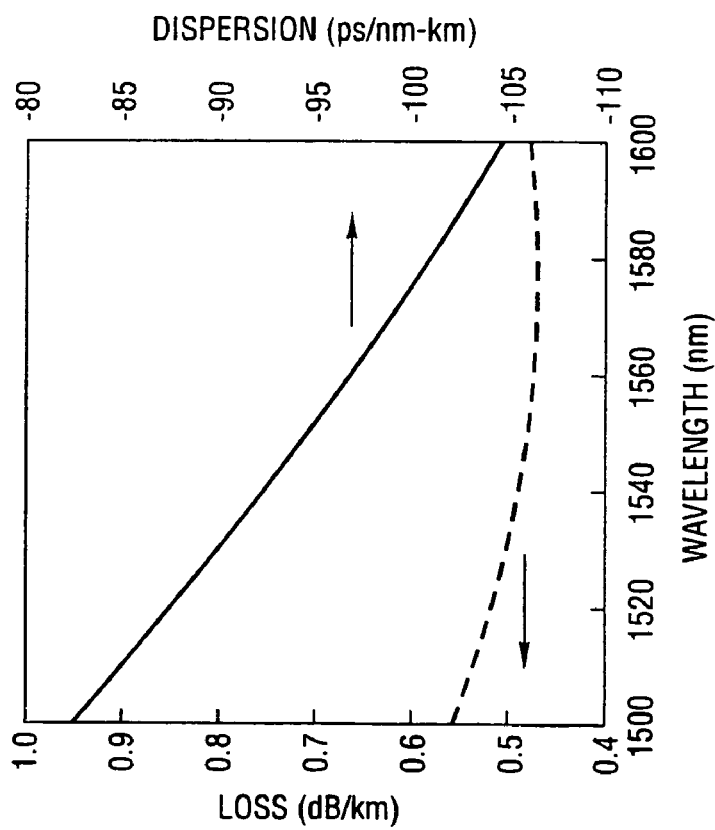
FIG. 3 is a graph which depicts the typical dispersion and loss versus wavelength for a dispersion compensating fiber (DCF) with large negative dispersion; in particular, these characteristics are measured in a Lycom product.

$\lambda_0 \approx 1550$ nm [nominal]
$S_0 \leq 0.085$ ps/nm$^2$-km
At $\lambda = 1500$ nm, $D \approx -4.25$ ps/nm-km
Link length. The amplifier spacing is assumed to be $L_{LINK} = 45$ km, which is a typical hut spacing in fiber-optic networks.
Gain Fiber. The gain fiber must always have a cut-off wavelength shorter than the pump wavelength. Possible candidates for the gain fiber include (perhaps not exactly these fibers, but fibers with similar dispersion properties)
(a) Standard SMF-28 fiber, which as a D=14.4 ps/nm-km at 1500 nm.
(b) DCF or highly negative dispersion fiber that is commercially available from Lycom. For example, FIG. 3 illustrates the loss and dispersion for such a fiber. In particular, the dispersion at 1500 nm is about D=−83 ps/nm-km.

Design # 1: Fiber Link Consisting of Standard Fiber

For a 45 km long link, the total dispersion in the link at $\lambda = 1500$ nm is $(D \times L)_{LINK} = (+14.4 \text{ ps/nm-km}) \times (45 \text{ km}) = +648$ ps/nm.

If we use DCF as in FIG. 3 for the gain fiber in the Raman amplifier, then the length of the gain fiber required is $L_{LINK} = (D \times L)_{LINK}/(-D_{DCF}) = (648 \text{ ps/nm})/(83 \text{ ps/nm-km}) = 7.8$ km This length is long compared to the typical length of 1 km usually used in Raman amplifiers.

To calculate the minimum gain required, the insertion loss of the gain fiber and the link loss need to be calculated. The loss of the DCF is approximately $\alpha L_{GAIN} = 0.55$ dB/km×7.8 km=4.3 dB.

The transmission link loss at 1500 nm is approximately $\alpha L_{LINK} = 0.22$ dB/km×45 km=9.9 dB.

Therefore, the pump power must be adjusted to provide at least a gain of $G > \alpha L_{GAIN} + \alpha L_{LINK} = 14.2$ dB.

It is important to also calculate the loss for a pump wavelength of about 1400 nm (i.e., one Raman order above the operating wavelength of 1500 nm) in the gain fiber. From FIG. 3, the extrapolated loss value at 1500 nm is approximately 0.8 dB/km. Therefore, the pump loss in the gain fiber is about $\alpha L_{PUMP} = 0.8$ dB/km×7.8 km=6.24 dB.

Since this exceeds the $L_{eff}$ for the nonlinear process, the gain fiber must either be pumped bi-directionally, or the two halves of the gain fiber must be pumped separately.

Design # 2: Fiber Link Consisting of Dispersion Shifted Fiber

For a 45 km long link, the total dispersion in the link at $\lambda = 1500$ nm is $(D \times L)_{LINK} = (-4.25 \text{ ps/nm-km}) \times (45 \text{ km}) = -191.25$ ps/nm.

If we use standard SMF-28 fiber for the gain fiber in the Raman amplifier, then the length of the gain fiber required is $L_{LINK} = (D \times L)_{LINK}/(-D_{SMF-28}) = (-191.25 \text{ ps/nm})/(-14.4 \text{ ps/nm-km}) = 13.28$ km This length is long compared to the typical length of 1 km usually used in Raman amplifiers.

To calculate the minimum gain required, the insertion loss of the gain fiber and the link loss need to be calculated. The loss in the standard fiber is approximately $\alpha L_{GAIN} = 0.22$ dB/km×13.28 km=2.92 dB.

The transmission link loss at 1500 nm in the DSF is approximately $\alpha L_{LINK} = 0.25$ dB/km×45 km=11.25 dB.

Therefore, the pump power must be adjusted to provide at least a gain of $G > \alpha L_{GAIN} + \alpha L_{LINK} = 14.2$ dB.

It is also necessary to calculate the loss for a pump wavelength of about 1400 nm in the gain fiber. In standard fiber the loss value at 1500 nm is approximately 0.5 dB/km. Therefore, the pump loss in the gain fiber is about $\alpha L_{PUMP} = 0.5$ dB/km×13.28 km=6.64 dB.

Since this exceeds the $L_{eff}$ for the nonlinear process, once again the gain fiber must either be pumped bi-directionally, or the two halves of the gain fiber must be pumped separately.

7. Preferred Embodiments of DMRA Amplifiers

Figure 4A:
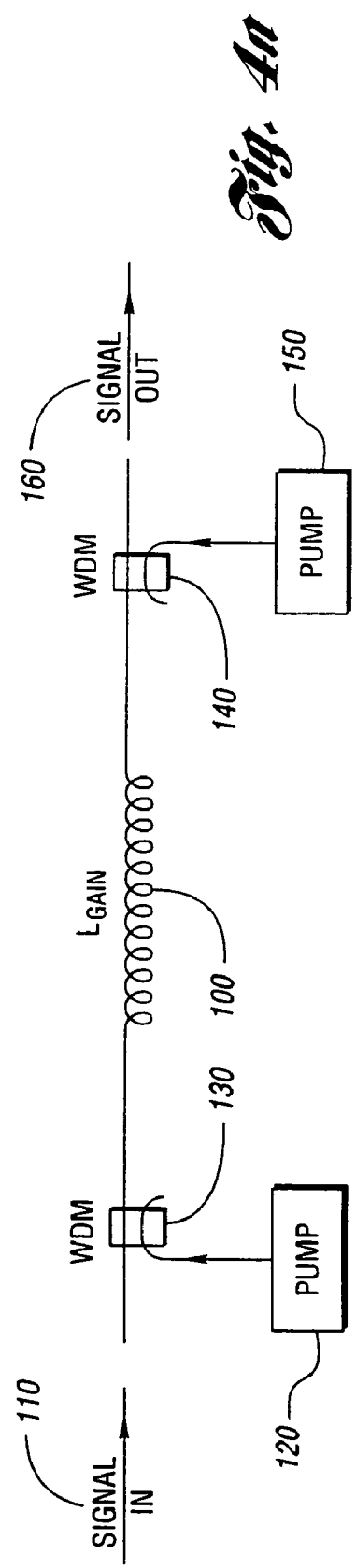

FIG. 4(a) shows a first embodiment of the invention which uses an open-loop design to provide for the dispersion managing Raman amplifier. The open-loop design is the simplest DMRA, although it may have a high pump power requirement. In the DMRA amplifier of FIG. 4(a), an optical signal is input from an input port 110 to an optical gain fiber 100. The optical gain fiber 100 is pumped bi-directionally by a pumping light generated by a pumping lasers 120 and 150. The gain fiber 100 is single spatial mode at both the signal and pump wavelengths, and the gain fiber possesses all the attributes discussed thus far. The amplified signal is then output through an output port 160. The pumps are coupled in through wavelength-division multiplexers (WDM's) 130, 140, which transmit the signal wavelength but couple over the pump wavelength.

To avoid coupling any pumping light fluctuations to the amplified signal, it is often desirable to have a strictly counter-propagating pump and signal geometry. The open loop configuration of FIG. 4(b) achieves this by splitting the gain fiber into two segments 200 and 210. Two pumps 240 and 270 are used to pump each segment, and WDM's 230 and 260 are used to couple in the pump. In addition, an optical isolator 250 is placed between the two segments to avoid any interference between the pump energy from 270 to 240, which might occur at WDM 230.

Figure 4E:
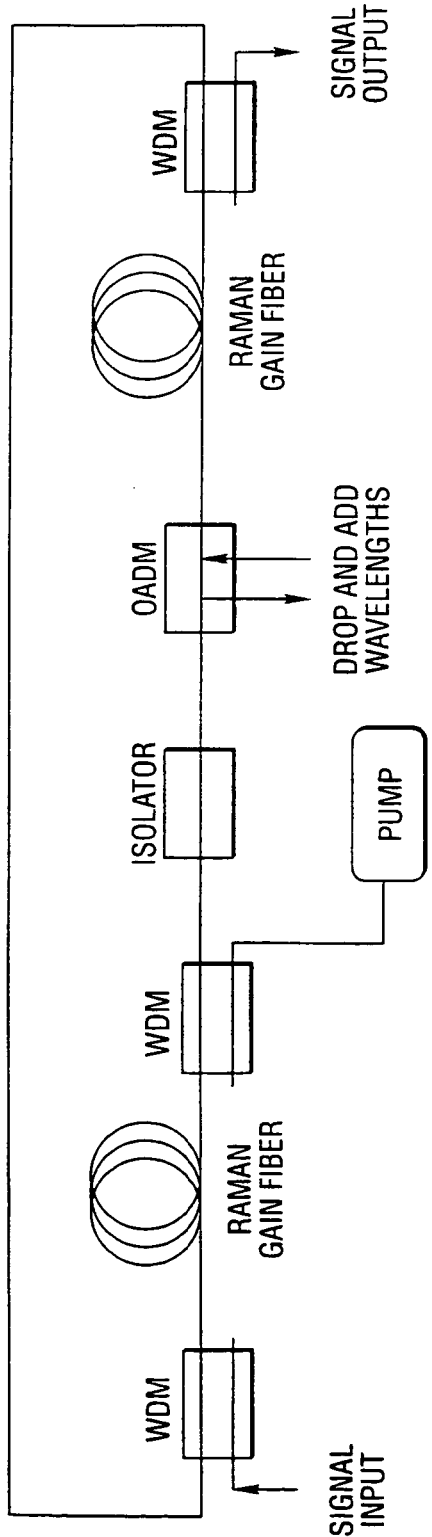
Figure 4F:
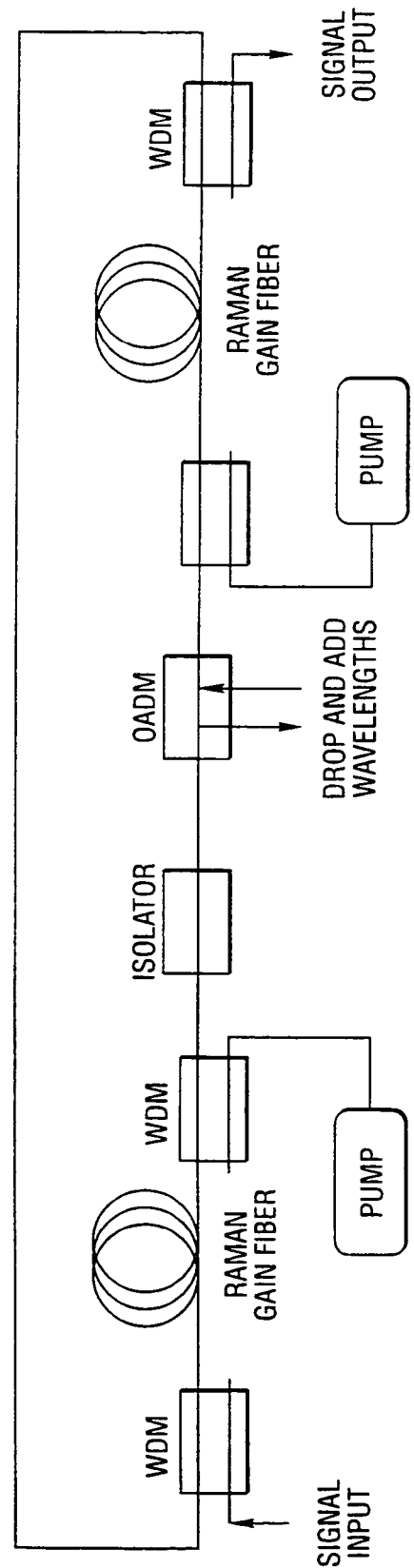

Although FIG. 4(*b*) uses an isolator between the two gain segments, it should be clear that other elements can be used instead. For example, a gain equalization element and/or an optical add/drop multiplexer (FIG. 1) may be used in place of or with the isolator (FIG. 4(*c*)). Because of the typically high insertion loss associated with add/drop multiplexers, an effective isolation is achieved between the pumps in the two segments.

An alternate configuration for the gain fiber pumping is also illustrated in FIG. 4(*d*). It should be noted that previous patents (i.e., U.S. Pat. Nos. 5,623,508 and 5,673,280) have also described implementations using isolators, where a pump shunt around the isolator is used. However, a better configuration is illustrated in FIG. 4(*d*). Here, the gain fiber is split into two lengths, the pump is introduced into a first fiber, the pump is shunted around where the signal is introduced and extracted, and then the pump enters the second gain fiber. An optional WDM may be used to remove any remaining pump, so as to avoid damage to the isolator. The isolator is placed between the two gain fibers. The advantages of this configuration over the prior art include:
- the first stage is a low-noise pre-amplifier;
- the isolator in the signal path further reduces noise;
- the second stage is a power amplifier, depleting pump power;
- a better noise figure since weak signal sees higher gain;
- better gain saturation performance; and
- same prevention of double Rayleigh scattering In addition, it should be clear that at the mid-stage of the two-stage amplifier other elements such as add/drop multiplexers can also be placed. For example, FIG. 4(*e*) illustrates the two-stage design of FIG. 4(*d*) along with an optical add/drop multiplexer at the mid-stage. Also, the configurations of FIG. 4(*d*) and FIG. 4(*e*) are unique and advantageous even if dispersion compensation fiber is not used as the gain fiber. Furthermore, it may also be desirous to have bi-directional pumping in the second stage of the two-stage amplifier, so as to increase the power amplifier gain without severely impacting the noise figure of the composite amplifier. This is illustrated in FIG. 4(*f*).

Figure 5:
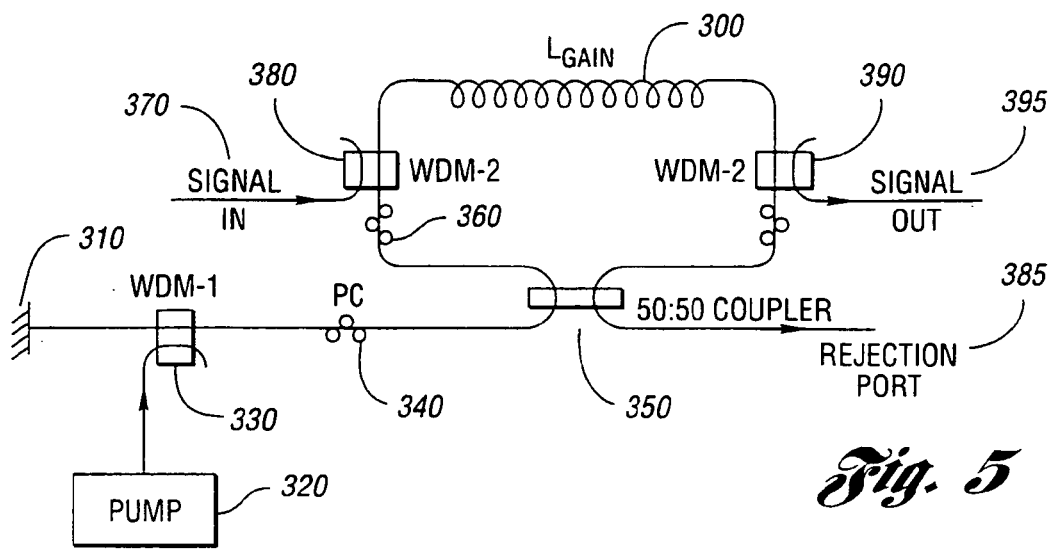
FIG. 5 is a schematic view which depicts a DMRA based on a Sagnac Raman cavity. One attribute of this configuration is that it automatically has bi-directional pumping of the gain fiber.

To reduce the pump power requirements, a broadband cavity such as the Sagnac Raman cavity can be used. FIG. 5 illustrates an embodiment of the DMRA that uses a Sagnac Raman cavity design with a bi-directional pumping. Referring to FIG. 5, the Sagnac Raman cavity of the DMRA is formed by a broadband mirror 310 and a loop mirror comprising a Raman gain fiber 300 and an optical coupler 350 connected thereto. The Sagnac Raman cavity design is described in U.S. Pat. No. 5,778,014, and this patent is incorporated herein by reference. An optical signal 370 is input through an input port 380 to the Raman gain fiber 300. A pumping laser 320 generates a pumping light that pumps the fiber 300 through a coupling means 330. The optical signal is amplified and then outputs through an output port 390. Note that in this configuration the pumping is inherently bi-directional for the gain fiber 300.

The Raman gain fiber has the same characteristics as described above for the open-loop design. Similarly, the pumping lasers used in the first embodiment are used in this second embodiment. The Sagnac DMRA may further include a polarization controller 360 in the Sagnac Raman cavity for controlling polarization state. However, if the fiber is polarization maintained, the polarization controller is not necessary. The optical coupler 350 is nominally 50:50 at least between the pump and one Raman order below the signal wavelength. The coupling means 330 is a WDM coupler that transmits the signal and intermediate Raman orders but couples over the pump. Moreover, the input port and output port each comprises a WDM coupler that transmits the various pump orders, but couples over the signal. A key advantage of the Sagnac Raman cavity is that it has a passive noise dampening property that leads to quieter cascading of various Raman orders. In particular, difference frequency noise is output through the rejection port 385.

Figure 6:
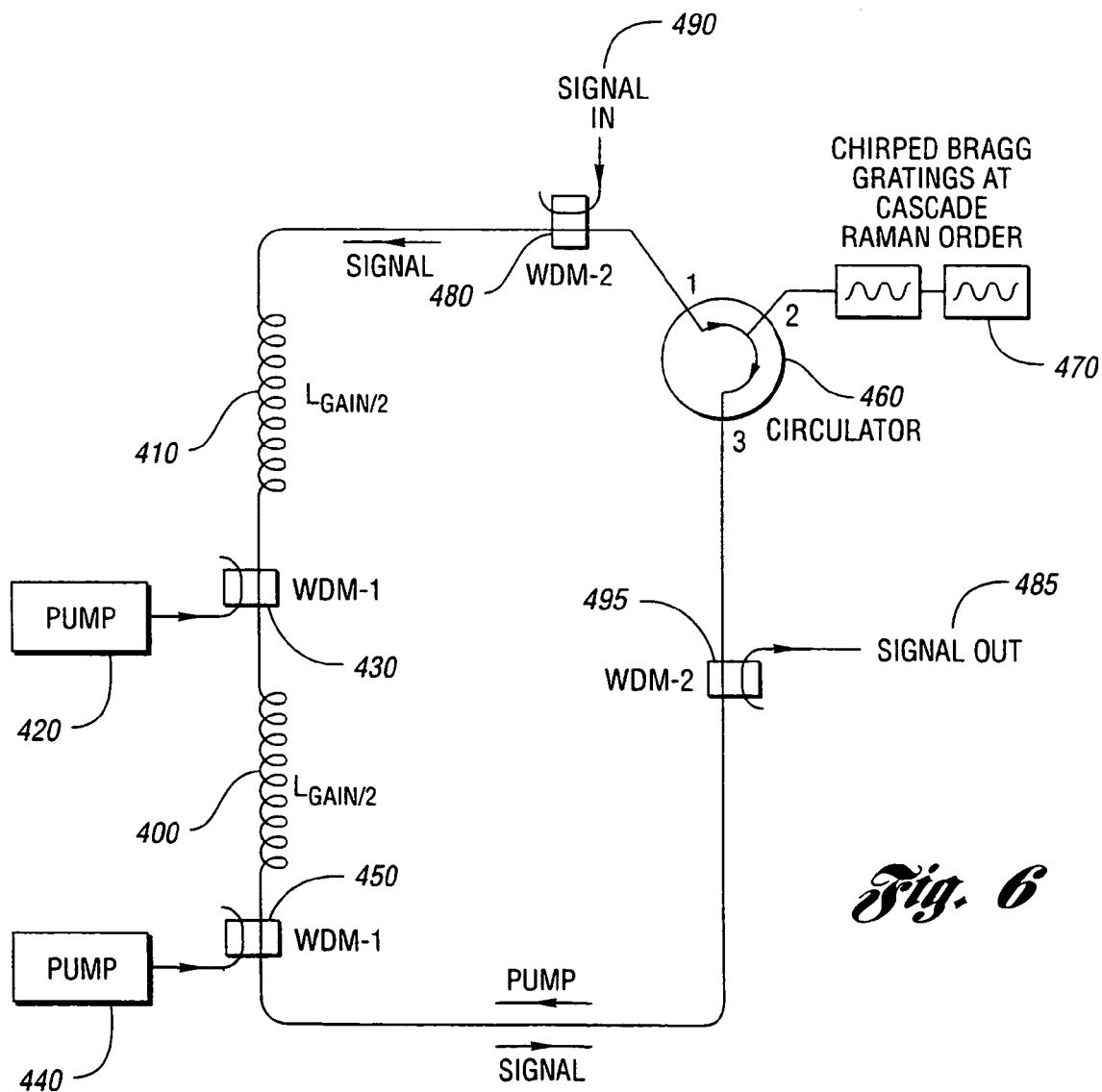
FIG. 6 is a schematic view which depicts yet another design of a DMRA based on a circulator loop cavity with chirped Bragg gratings; the circulator loop cavity insures that the signal and Raman pump orders are counter-propagating, while the chirped Bragg gratings provide wavelength control.

Another configuration of the DMRA uses a circulator loop cavity with chirped fiber gratings, as shown in FIG. 6. The circulator loop cavity design is described in the above-noted U.S. patent application entitled "Chirped Period Gratings for Raman Amplification in Circulator Loop Cavities". This patent application is incorporated herein by reference. The configuration of FIG. 6 accomplishes two desired goals. First, the signal and cascade Raman pumps are counter-propagating, thus reducing any cross-talk. Second, the chirped Bragg gratings 470 are introduced into the loop for wavelength control. The chirped Bragg gratings provide broadband reflection at the various Raman cascade orders. Thus, the wavelengths for the various cascade Raman orders are selected, while broadband enough reflection is provided to permit broadened bandwidth at each subsequent cascade order.

The chirped Bragg gratings 470 permit tailoring the bandwidth at the various Raman orders while reducing the fiber insertion loss. Commercial gratings are now available with bandwidths as large as 40–50 nm. Also, adjusting the length and variation in periodicity of the grating can control the bandwidth. The Bragg condition at the center of each of the gratings is made to coincide with the maximum gain wavelengths of the cascade Raman orders. One feature of fiber Bragg gratings, however, is that they operate in reflection mode only. Hence, the gratings are introduced into port 2 of the circulator 460.

Optical circulators 460 are non-reciprocal devices that redirect light from port to port sequentially in only one direction. In particular, input from port 1 is redirected to port 2. However, a reverse signal entering port 2 totally transmits to port 3 as a usable signal. Ports 1 and 3 are completely isolated. Optical circulators are 3-port coupling devices that are made to be polarization independent and with low insertion loss. Also, optical circulators are based on optical isolator technology, which is well-established at this point.

The circulator 460 should be broad band enough to operate properly at the pump and cascade Raman order wavelengths. Two ports of the circulator (ports 1 and 3) are connected by lengths of Raman gain fiber 400 and 410. This Raman gain fiber possess all the attributes of dispersion compensation, as described above. The gain fiber is split into two segments, each of which can be pumped effectively. The pumps 420 and 440 at wavelength $\lambda_p$ are introduced in the clockwise direction using WDM couplers 430 and 450. These couplers should transfer over the pump wavelength while passing through the cascade Raman orders and the signal wavelength. The pump and various cascade Raman orders circulate in the clockwise direction around the loop.

The signal traverses the circulator loop in the counter-clockwise direction, opposite to the pump and the various cascade Raman orders. The signal 490 is introduced at one end of the Raman gain fiber using a WDM 480 and removed from the other end of the fiber using WDM 495. These WDM's should transfer over the signal wavelength, while passing through the pump and the cascade Raman orders.

8. Gain Equalization for WDM Systems with Raman Amplifiers

To use any of these embodiments with multi-wavelength WDM channels, it will most likely be necessary to include at the output of the amplifier some means for equalizing the gain. Alternately, as shown in FIG. 4(c), the gain equalization can be placed at the mid-stage access in a two-section gain fiber. This wavelength dependency or nonuniformity of the gain band has little impact on single-channel transmission. However, it renders the amplifier unsuitable for multichannel operation through a cascade of amplifiers. As channels at different wavelengths propagate through a chain of amplifiers, they accumulate increasing discrepancies between them in terms of gain and signal-to-noise ratio. Using gain-flattening elements can significantly increase the usable bandwidth of a long chain of amplifiers. For example, the DMRA can be followed by a gain flattening element to provide gain equalization for different channels (c.f. FIG. 1).

Figure 7A:
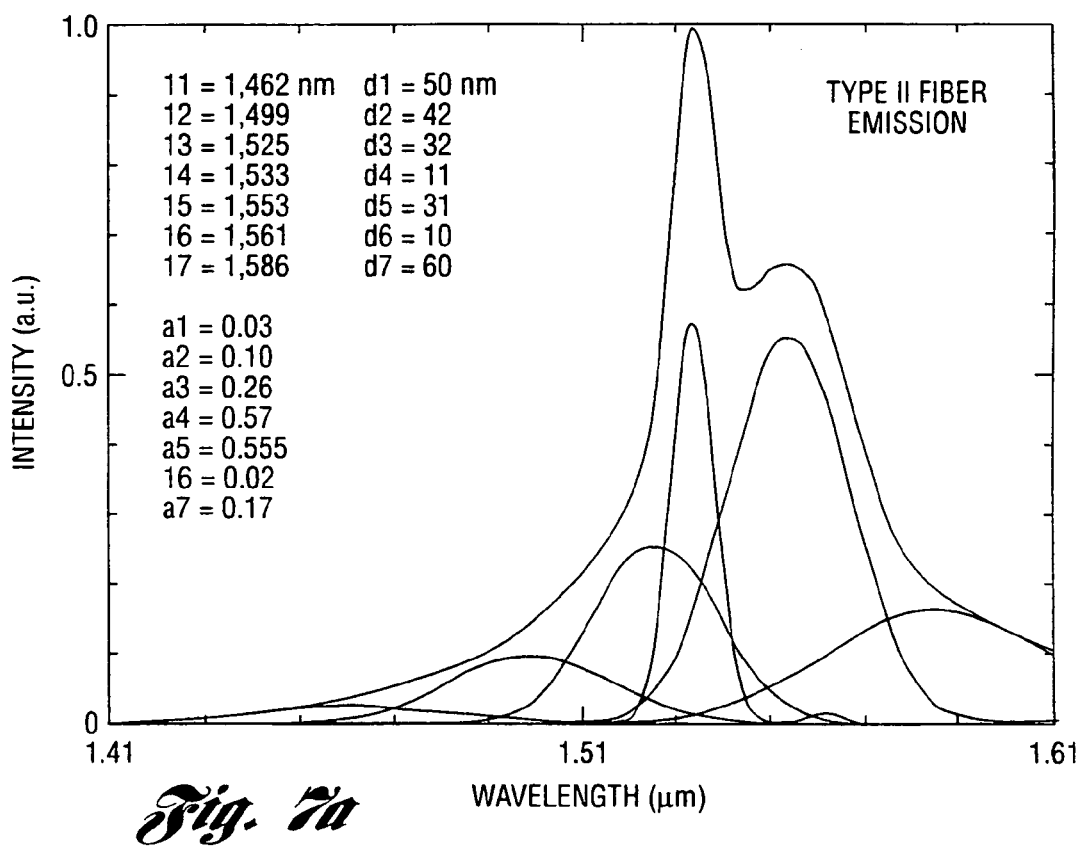
FIGS. 7(a) and 7(b) are graphs which depict the fitting of the EDFA and Raman gain band with different Gaussian functions; while the EDFA band of FIG. 7(a) requires five Gaussian functions, the Raman gain band of FIG. 7(b) can be well approximated with two Gaussian functions.
Figure 7B:
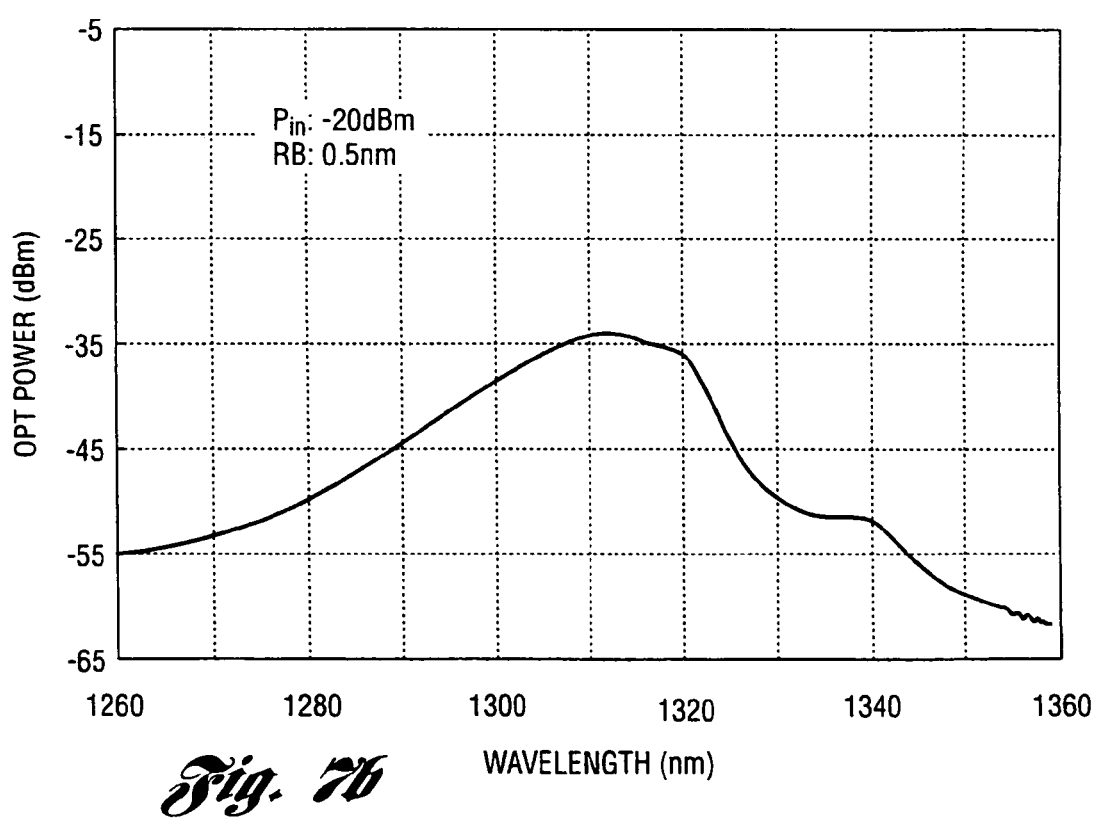

The difficulty of implementing the gain flattening element is determined by the complexity of the required filter function, which can be characterized according to the number of Gaussian or Fourier terms needed to fit the gain spectrum. For example, the typical EDFA gain band requires five Gaussian terms to fit the useable band (FIG. 7(a)). On the other hand, the Raman gain spectrum (FIG. 7(b)) is much smoother, and it can reasonably be fit using only two Gaussian terms. Consequently, gain equalization for Raman amplifiers is simpler than for EDFA's.

There are at least four approaches for gain flattening filter types. The different approaches and the trade-offs between them include:

- Mach-Zehnder interferometers. Simple functions. Useful for red or blue band filters. Less useful for notch or broad band filters
- Lattice Devices. A series of couplers and delay lines. Can fit notch filters and the broad band erbium spectrum using a Fourier series
- Dielectric Filters. Broad band and notch filters possible. Fourier series like.
- Long Period Gratings. Broad band and notch filters possible. Gaussian series like.

Of these choices, Mach-Zehnder interferometers are probably the cheapest and easiest to make. Therefore, the gain equalizer element 60 in FIG. 1 can be cost effectively implemented using two Mach-Zehnder interferometers.

9. WDM Systems for Transmission Links Using DS Fiber

Transmission systems based on conventional DS fiber with a zero dispersion wavelength of about 1550 nm face major difficulties when upgrading their capacity using multiple WDM channels and EDFA's. The gain band for EDFA's spans about 1535–1565 nm, with the flattened gain section typically between 1540–1560 nm. Due to penalties from 4WM, wavelengths in the vicinity of the zero dispersion wavelength (i.e., approximately 1540–1560 nm) cannot be used for WDM systems. Therefore, much of the useful bandwidth of EDFA's is unavailable for WDM upgrades when using DSF in the transmission links.

However, WDM systems can be implemented in transmission systems based on DSF by moving to the "violet band" (i.e., 1430–1530 nm), well away from the zero dispersion wavelength. Raman amplifiers can be used to provide gain in this wavelength window, including designs based on the prior art and the DMRA's described herein. Because of the finite negative value of dispersion for DSF in the violet band, the major nonlinearity penalties for WDM systems are managed. Namely, 4WM no longer phase matches because of the finite dispersion value. Also, MI is avoided in the transmission link since operation is in the normal dispersion regime (i.e., D<0).

It is further advantageous to use DMRA's so the transmission line can be dispersion managed. Dispersion management refers to transmission systems where the local dispersion is high, so as to avoid 4WM, while the average dispersion over the link is approximately zero, so as to avoid dispersive pulse broadening. Dispersion management requires that the transmission line dispersion vary in sign between positive and negative values, allowing cancellation of the accumulated dispersion over a given transmission span. In a transmission system based on DSF, DMRA's can easily provide dispersion management by using as the gain fiber standard dispersion fiber. This has the added advantage of reducing the cost of the gain fiber, since standard fiber is a well-matured product with a large volume market.

An exemplary design of a dispersion managed WDM transmission system with DSF links is illustrated in FIGS. 8(a)–8(c). The input 530 and output 540 signals are multiple wavelength WDM channels, which are typically spaced uniformly by 100 GHz (or 0.8 nm). The transmission line is periodic with segments including a link of DSF 510 and a DMRA 570. For this example, the DMRA is assumed to operate in the violet band between 1430–1530 nm, and the gain fiber conveniently has standard dispersion. If necessary, gain equalizers 580 can also be placed periodically within the transmission line. As described in the previous section, gain equalizers can be just one or two stages of Mach-Zehnder interferometers. The gain equalizers can be conveniently included along with each DMRA.

FIGS. 8(a)–8(c) also illustrate the dispersion and nonlinearity management in this exemplary system. In particular, the local dispersion is negative in the transmission link but positive in the DMRA's. With the proper selection of dispersion compensating fiber for the DMRA, as described earlier, the accumulated dispersion can be made to balance in each transmission segment at the middle of the WDM wavelength band.

10. Minimizing Gain Tilt by Symmetric Addition of Channels in Multi-Band WDM Systems As bandwidth utilization of the fiber increases, a major problem anticipated is the gain tilt across the band due to energy exchange arising from the Raman effect. In particular, the Raman effect shifts energy from shorter wavelengths to longer wavelengths. Also, the Raman gain increases approximately from zero frequency difference up to its peak at 13.2 THz (or about 100 nm around a wavelength of 1550 nm). Therefore, the Raman effect is important for WDM channels spaced from little frequency difference up to 13.2 THz frequency separation, and the magnitude of the energy exchange for CW channels increases with increasing frequency separation. Also, it should be clear from the above discussion that the Raman gain tilt becomes an increasingly important effect as new wavelength bands are added. The first order effect from Raman is energy exchange, and a second order effect might be channel cross-talk.

Today's fiber-optic transmission systems for long-haul use the erbium-doped fiber amplifier (EDFA). The conventional band (C-band) for EDFA's is roughly 1530–1565 nm, which is 35 nm wide. As several spans are cascaded and the number of wavelengths is increased, the influence from Raman gain tilt (i.e., less gain at shorter wavelengths and more gain at longer wavelengths) is already being observed. The tilt is expected to become worse as the system bandwidth is increased.

As the demand for bandwidth continues to rise, there are plans to add a new wavelength band: the long-wavelength or L-band. This L-band spans roughly 1565–1610 nm, so the resulting total bandwidth between the C- and L-bands will be about 80 nm. Note that the wider wavelength range begins to approach the peak of the Raman gain. Therefore, the addition of the new band is expected to result in a significant Raman gain tilt across the already deployed C-band.

Figure 9A:
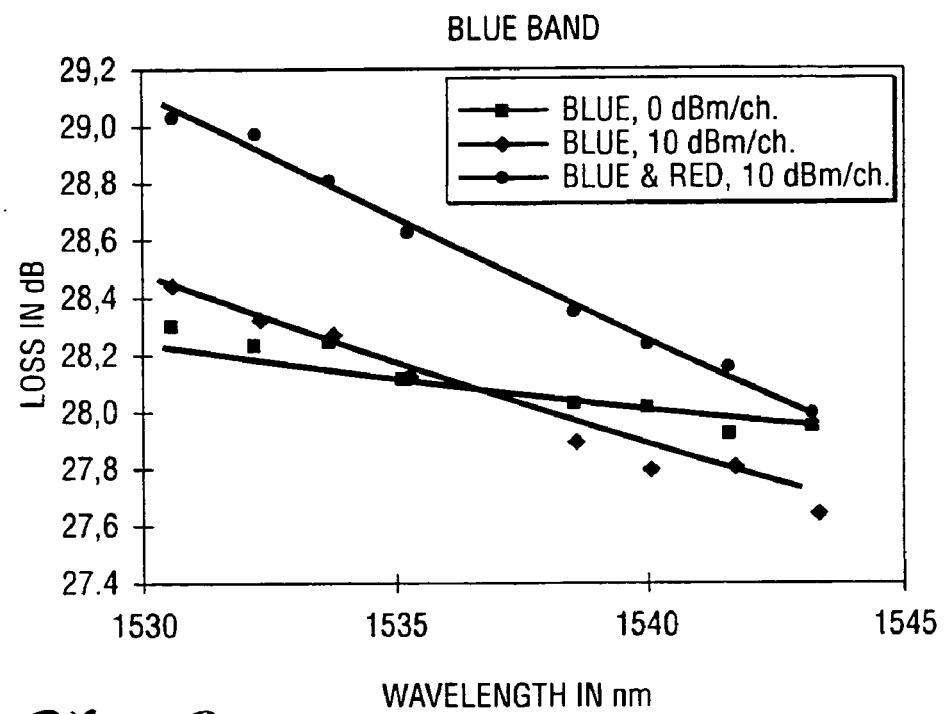
FIGS. 9(a) and 9(b) are graphs which depict the gain tilt for the blue- and red-bands of just the conventional C-band (after P. M. Krummrich, E. Gottwald, A. Mayer, C.-J. Weiske and G. Fisher, "Influence of SRS on the channel power balance in bi-directional WDM transmission," presented at the Optical Fiber Communications Conference OFC'99, San Diego, Calif., February 1999, contributed paper WJ-6)
Figure 9B:
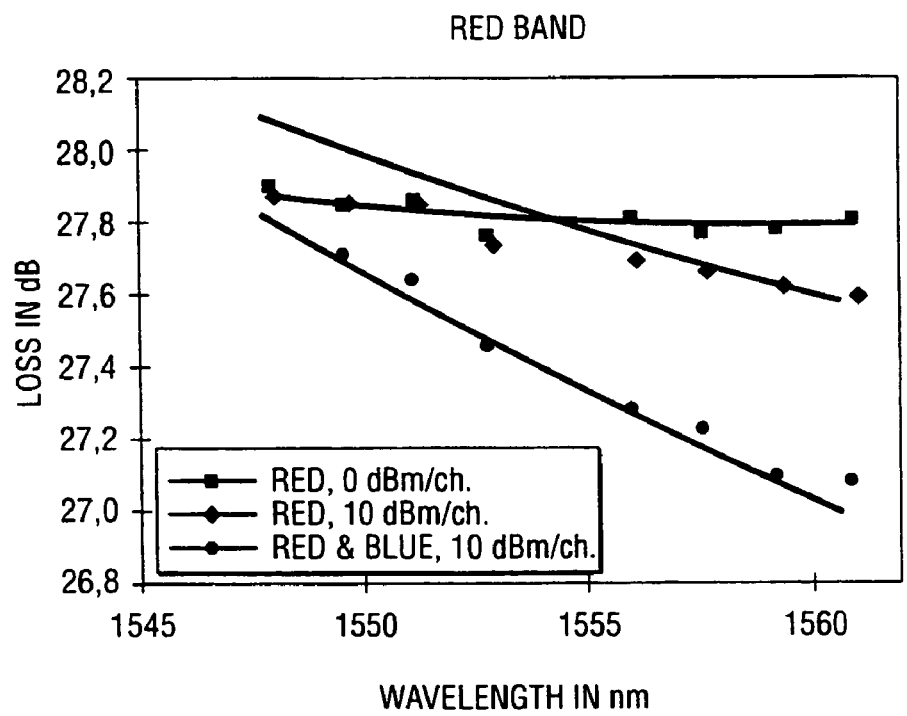
Figure 10A:
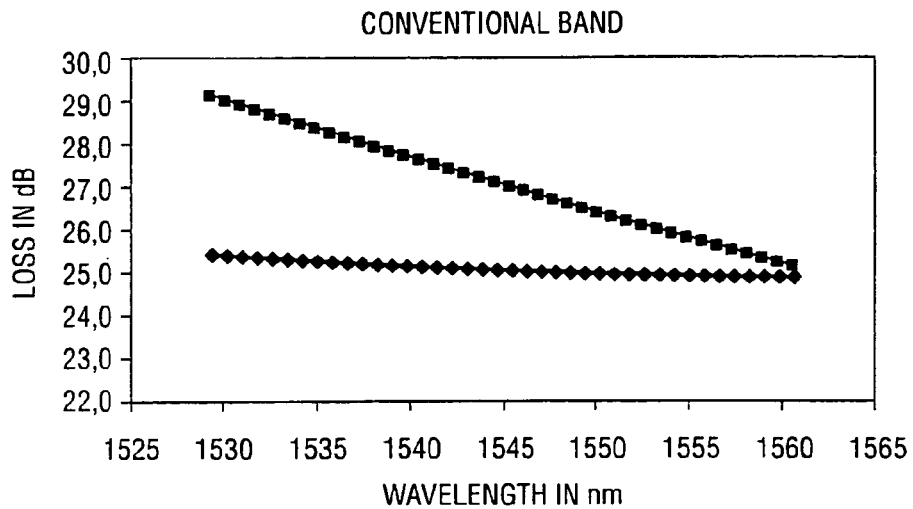
FIGS. 10(a) and 10(b) are graphs which depict the gain tilt for the conventional C-band when supplemented with the long-wavelength L-band (after P. M. Krummrich, E. Gottwald, A. Mayer, C.-J. Weiske and G. Fisher, "Influence of SRS on the channel power balance in bi-directional WDM transmission," presented at the Optical Fiber Communications Conference OFC'99, San Diego, Calif., February 1999, contributed paper WJ-6)
Figure 10B:
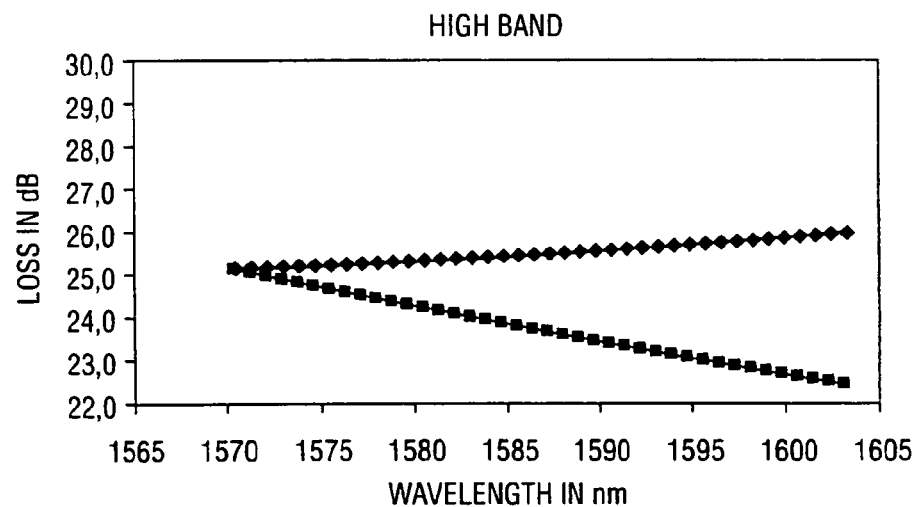

To illustrate the Raman gain tilt changes, a number of groups have studied the effect both theoretically and experimentally. For example, a group at Siemens have studied the effect of gain tilt across the C-band alone and the combined C- and L-bands (P. M. Krummrich, E. Gottwald, A. Mayer, C.-J. Weiske and G. Fisher, "Influence of SRS on the channel power balance in bi-directional WDM transmission," presented at the Optical Fiber Communications Conference OFC'99, San Diego, Calif., February 1999, contributed paper WJ-6). They define the following bands:

"blue band"-1530 to 1545 nm in C-band
"red-band"-1545 to 1560 nm in C-band
"high-band"-1570–1605 nm in L-band FIGS. 9(a) and 9(b) show the experimental results from Siemens for just the C-band (Raman gain tilt from the blue-band to the red-band), and the maximum change is less than about 1 dB across either half of the band. On the other hand, FIG. 10 shows the Siemens calculations for C-band with L-band addition, and the maximum change in either band can be as great as 4 dB.

It is advantageous if new bands can be introduced without requiring changes in and minimizing the impact on the existing bands. However, due to the Raman effect, existing C-band EDFA's must be retrofitted with devices for providing adjustable gain tilt. Since the gain tilt will depend on the number of channels, the channel spacing, the span length, and the overall bandwidth, having an adjustable gain tilt is valuable. However, the desire would be to add new bands while minimizing the changes in the existing C-band. New "knobs" can always be incorporated into the new bands being added, but it is difficult to require new features from existing bands.

Symmetric Addition of Bands to Minimize Changes in C-Band

A simple way to minimize changes in the C-band is to symmetrically add channels or bands to both the short and long wavelength side of the C-band. Then, longer wavelength channels may remove energy from the C-band, but shorter wavelength channels will replenish the energy. Although the slope of the gain tilt depends only on the net power, the symmetric addition of bands can move the zero-crossing or fulcrum of the gain changes to the center of the C-band.

Experiments have illustrated the potential advantages of symmetric addition of bands to minimize changes over the C-band. For example, NTT Network Innovation Laboratories have performed three-band transmission over 100 km of dispersion-shifted fiber (J. Kani, K. Hattori, M. Jinno, S. Aisawa, T. Sakamoto and K. Oguchi, "Trinal-wavelength-band WDM transmission over dispersion-shifted fiber," presented at Optical Fiber Communications Conference OFC'99, San Diego, Calif., February 1999, contributed paper WJ-2). FIG. 11 shows their experimental results with three bands: while the shorter wavelength band experiences an effective loss and the longer wavelength band experiences gain, the C-band (or M-band, as they call it) has a minimal change across the band.

More specifically, we describe the following bands that apply to the already deployed fibers and their low-loss window:

$S^+$-band: 1430–1480 nm
S-band: 1480–1530 nm
C-band: 1530–1565 nm
L-band: 1565–1610 nm EDFA's exist for the C-band and L-band. However, for the shorter wavelength S-band and $S^+$-band, Raman optical amplifiers can be used. If we add channels symmetrically placed in frequency or energy around the C-band (i.e., one channel in the L-band and a symmetric channel in the S-band), then effects from the Raman gain tilt will be minimized on the C-band.

Impacts of Raman Gain Tilt on Amplifiers

From the previous figures, it should be clear that the S-band will require more gain from the optical amplifier than just to compensate loss because of the Raman energy exchange. Similarly, less gain from the L-band optical amplifier than just to compensate loss is going to be required due to the Raman energy exchange.

Most digital systems require a signal-to-noise (SNR) ratio of about 20 dB for 2.4 Gb/s systems. Since the same SNR will be required for all three bands, the higher gain required in the S-band also places additional demands on the S-band optical amplifier. In other words, higher gain means generally more noise (i.e., amplified spontaneous emission), which adversely affects the SNR. One way to maintain the same SNR in the S-band and C-band is to reduce the bit rate in the S-band. Alternately, the same SNR can be maintained by using an optical amplifier with a lower noise figure (NF) in the S-band than in the C-band.

The C-band and L-band use EDFA's for the optical amplifiers. However, the S-band can use Raman amplifiers. In principle, a Raman amplifier can have a lower noise figure than an EDFA because it is a four-level like system. In other words, the noise figure is proportional to $N_2/(N_2-N_1)$, where $N_2$ is the upper level carrier density and $N_1$ is the ground state carrier density. Whereas this parameter is usually greater than unity for an EDFA, it is approximately equal to one in a Raman amplifier.

Another means of achieving an improved NF for the S-band is to use distributed Raman amplification (as discussed in next section). For example, experiments by Tyco Submarine Systems (M. X. Ma, H. D. Kidorf, K. Rottwitt, F. W. Kerfoot and C. R. Davidson, "240-km Repeater Spacing in a 5280-km WDM System Experiment Using 8×2.5 Gb/s NRZ Transmission," IEEE Photonics Technology Letters, Vol. 10, pp. 893–896 (1998)) show that distributed amplification results in a ~2 dB reduction or improvement in the NF as compared with a discrete amplifier. Instead of placing a discrete S-band amplifier at each amplifier location, a pump would be introduced that is shorter in wavelength by ~13.2 THz from the S-band wavelengths (i.e., pump can be from 1330 nm to 1430 nm).

It should be noted that the symmetric addition of new channels around the C-band only solves the first-order impact of the Raman effect—namely, the gain tilt resulting from energy exchange. There may also be secondary effects from inter-channel interference. These secondary terms can be kept small by insuring sufficient dispersion between channels, so that there is adequate walk-off between channels to reduce any pattern dependent cross-talk.

11. Distributed Raman Amplification in Multi-Band WDM Systems

The above sections have described nonlinearity impairments from 4WM and Raman gain tilt that become increasingly important as new bands are added and the channel count increases. Another way of minimizing these nonlinearity empairments is to reduce the power per wavelength channel. This can be achieved without degradation of the signal-to-noise ratio at the receiver by using distributed Raman amplification. In particular, distributed Raman amplification can be achieved by pumping the fiber composing the transmission line with a Raman oscillator or laser diodes directly. The pump light produces Raman gain for the signal using the inherent Raman gain in the transmission fiber. Since the gain is inherent to the transmission line, this provides a graceful means of upgrading even existing fiber-optic systems.

The power per channel can be reduced because distributed Raman amplification cancels or compensates for the loss in the fiber. Said another way, the distributed Raman gain has an effectively better noise figure than its discrete amplifier counterparts. The channel power can be lowered to the point that nonlinearities become insignificant. For example, in a typical transmission system at power of 0 dBm (1 mW) is used at OC-48 or 2.5 Gb/s and 6 dBm (4 mW) at OC-192 or 10 Gb/s per channel. With the addition of distributed amplification, OC-192 systems have been demonstrated in the laboratory with power per channel as low as −13 dBm (0.05 mW).

Distributed Raman amplification can also help in gain control or gain clamping. i.e., It is undesirable to have the gain level change when channels are added or dropped, such as when optical add/drop multiplexers are used. This gain clamping problem can be solved to a large extent by using distributed Raman amplification because the power per channel is significantly reduced. The lower power insures that there will be negligible gain or pump depletion. Therefore, the combination of lower power per channel and negligible gain depletion provides an effective gain clamping.

Calculations Showing Improved Noise Figure

Figure 13:
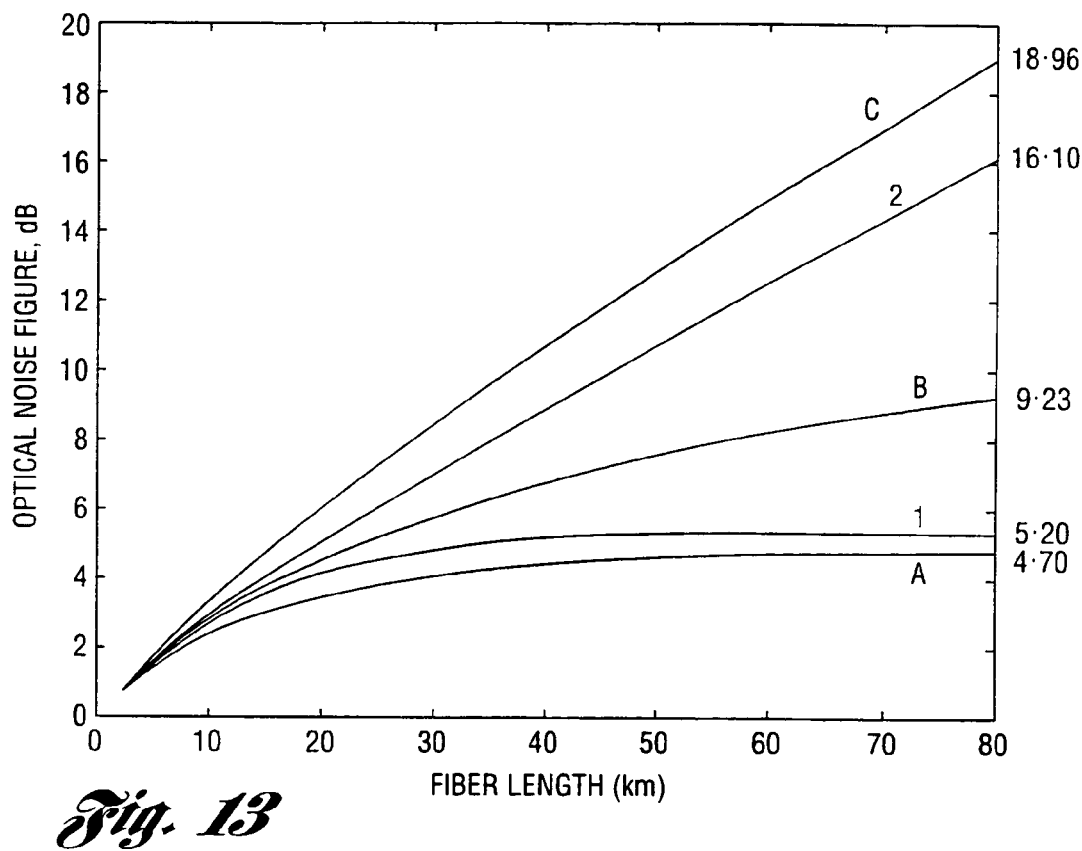
FIG. 13 is a graph which depicts the calculated optical noise figure versus fiber length for different cases; more realistic than FIG. 12, here the pump attenuation is assumed to be 0.5 dB/km while the signal attenuation is assumed to be 0.2 dB/km in the fiber; (A) amplifier followed by fiber, (B) uniformly distributed amplifier, (C) fiber followed by amplifier, (1) forward pumped Raman amplifier, and (2) backward pumped Raman amplifier.
Figure 14:
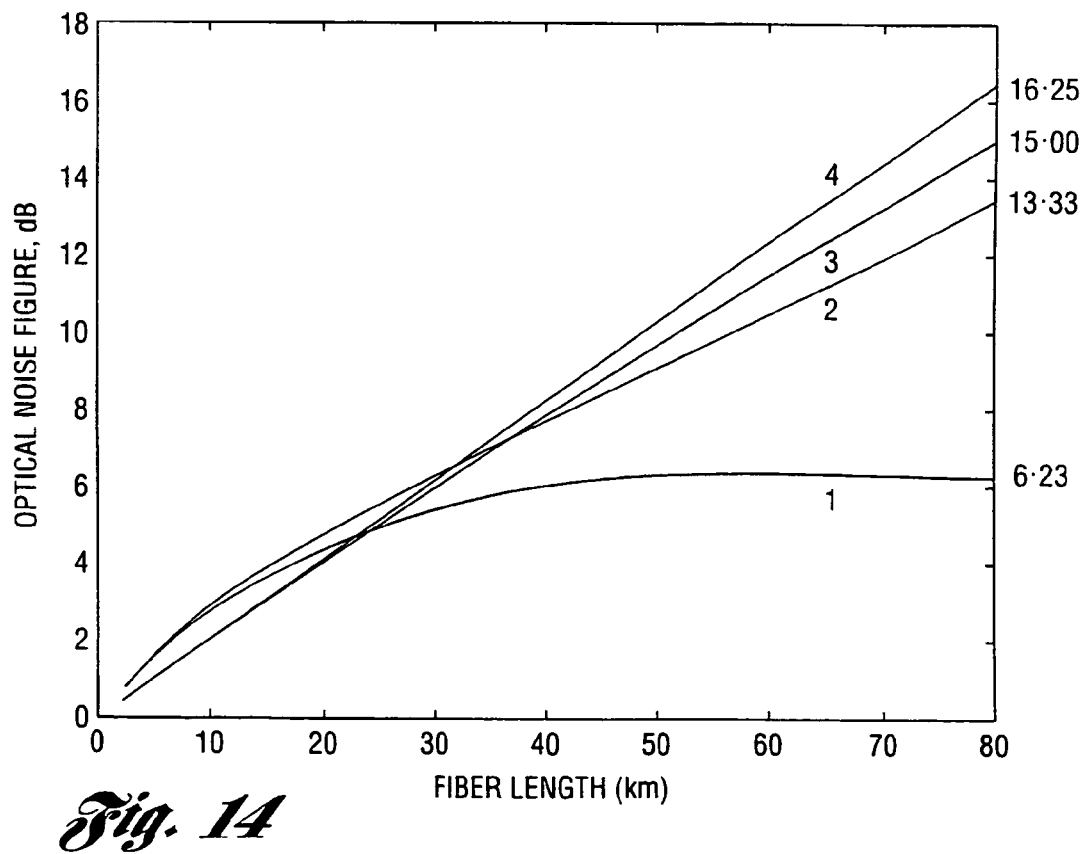
FIG. 14 is a graph which depicts the calculated optical noise figure versus fiber length for different kinds of distributed Raman amplifiers; (1) Forward pumped Raman amplifier assuming pump and signal attenuation of 0.2 dB/km, (2) backward pumped Ra man amplifier assuming pump and signal attenuation of 0.2 dB/km, (3) bi-directional pumped Raman amplifier assuming both pump and signal attenuation of 0.2 dB/km, and (4) bi-directional pumped Raman amplifier with the same conditions as (3) except that the pump attenuation constant is assumed to be 0.5 dB/km.

Distributed Raman amplification improves the effective noise figure of the amplifiers in a transmission line. Examples of noise figures for different amplification schemes are shown in FIGS. 12–14, as a function of transmission length (i.e., length of a period in periodically amplified systems).

Yariv has discussed methods of computing signal-to-noise ratios in his paper, "Signal-to-noise considerations in fiber links with periodic or distributed optical amplification," (Optics Letters, Vo. 15, pp. 1064–1066 (1990)). E. Desurvire has discussed distributed amplifiers in his book, "Erbium-doped fiber amplifiers, Principles and Applications," John Wiley & Sons, 1994. Details of the methodology are available in Desurvire's paper, "Theory and Implementation of a Raman Active Fiber Delay Line," (IEEE Journal of Lightwave Technology, April 1986, pp. 426–443). However, this paper does not deal with bi-directional pumping and considers only the case when the attenuation constants for both the signal and the pump are the same. Yariv does not discuss the effects of pumps at all. Following their general approach, we were able to derive closed form solutions of the general case for different attenuation constants and for the bi-directional pumping case with variable intersection of the forward and backward pumps. Our formulation for the bi-directional case allows the attenuation constants for the forward and backward pumps to be different from that of the signals. As expected, our formulation involves some integrals that need to be evaluated using a computer. For the case when the signal and pump attenuation constants are the same, we were able to reduce our general expression to agree with Desurvire's formula analytically. For the bi-directional pumping case, our formula reduces to Desurvire's backward pump case when we let the point of intersection to be the beginning of the transmission line (i.e., no forward pump).

The results are presented in several figures. FIG. 12 shows that for the special case of the attenuation constants for the signal and the pump the same, our noise figures are identical to those presented by Desurvire in his book (FIG. 2.20, p. 126), although our maximum line length is 80 km compared to Desurvire's maximum line length of only 50 km. The attenuation constant is assumed to be 0.2 dB/km. There are five plots on this figure: they are marked A, B, C, 1, and 2. The curves A and C are for the lumped amplifier case: A for the case of the amplifier at the beginning of the line, followed by the line; C for the reversed case, i.e., line first and then amplifier. Curve B is for uniformly distributed amplification. On the other hand, Plot 1 is for forward distributed Raman pumping and Plot 2 is for backward distributed Raman pumping. FIG. 13 is identical to FIG. 12 except that the pump attenuation constant is assumed to be 0.5 dB/km while the signal attenuation constant is kept at 0.2 dB/km. This latter situation is closer to reality for most current deployed fibers.

As is evident from these figures, Case A has the lowest noise figure and Case C has the highest (at 80 km line 4.7 dB and 18.96 dB, respectively). The uniform distributed gain gives a noise figure (Plot B) of 9.23 dB at 80 km length, which is between the cases A and C. The amplifier first (case A) is best because the noise introduced by the amplifier is also attenuated by the fiber transmission, while in the worse case (case C) the noise is introduced at the very end. When we increase the pump attenuation constant to 0.5 dB/km from 0.2 dB/km, the noise figures for the forward Raman pump goes down to 5.20 dB from 6.23 dB, but for the backward Raman pump it goes up from 13.33 dB to 16.10 dB. This is because as the pump attenuation is increased, the distributed amplifier approaches more closely the discrete amplifier case.

FIG. 14 shows the noise figures for the (1) forward Raman pump, (2) backward Raman pump, and (3) bi-directional Raman pump, all with attenuation constants of 0.2 dB/km. The plot 4 is for the bi-directional case with the pump attenuation constant set to 0.5 B/km. For the bi-directional cases, we assume the intersection of the forward and backward pumps to be at the middle of the line section. The noise figures for the four plots at the 80 km section are 6.23, 13.33, 15.00 and 16.25 dB, respectively. The plots show that at large distances the noise figures for the bi-directional cases are worse than that of the backward pump case. However, if the line length is small (below 40 km), some improvement is possible over the backward pumped case. As pointed out by Desurvire, bi-directional pumping has two advantages (in addition to the possibility of improved noise figure): (1) reduced input pump power at both fiber ends; and (2) a more uniform medium inversion along the fiber, which can be particularly important at high-bit rates using short pulses.

Experiments Using Distributed Raman Amplification

That nonlinear effects in fiber transmission systems can be avoided by use of distributed or hybrid Raman amplification has been illustrated in a number of recent experiments. For example, researchers at NTT Network Innovations Laboratories have demonstrated transmission in DSF around the zero-dispersion region in a single wavelength band. In particular, they demonstrate dense-WDM (DWDM) transmission of 32 channels with 50 GHz spacing and bit-rate of 10 Gb/s over 8×80 km (N. Takachio, H. Suzuki, H. Masuda and M. Koga, presented at the Optical Fiber Communications Conference OFC'99, February 1999, San Diego, Calif., post-deadline paper PD-9). Normally, DWDM systems in the neighborhood of the zero dispersion wavelength suffer from 4WM penalties. However, by lowering the channel power down to −13 dBm with the use of distributed Raman amplification, 4WM is avoided and the results verify feasibility of DWDM transmission in DSF.

Almost simultaneously, another group at Bell Labs/Lucent Technologies also demonstrated DWDM transmission near the zero dispersion wavelength without 4WM or other nonlinearity penalties in a single wavelength band (P. B. Hansen, A. Stentz, T. N. Nielsen, R. Espindola, L. E. Nelson and A. A. Abramov, presented at Optical Fiber Communications Conference OFC'99, February 1999, San Diego, Calif., post-deadline paper PD-9). They perform several experiments: (a) 25-channel, 100 GHz spacing of 10 Gb/s channels, transmission over 8×83 km; (b) 49-channel, 50 GHz spacing of 10 Gb/s channels, transmission over 4×83 km. They conclude that significant improvements can be obtained at a pump power of only 440 mW in DSF by using hybrid Raman/erbium-doped fiber amplifiers.

These two experiments show that distributed Raman amplification can minimize nonlinear effects between WDM channels effectively in single band experiments (i.e., the experiments are conducted only in the so-called "C-band" or conventional band between 1535 and 1565 nm). However, when multi-band transmission is considered, there will be a need for one or more pump wavelength per band. In this case, the nonlinear interaction between pumps can lead to large changes in the gain levels in different bands. For example, the Raman effect between pumps will lead to longer wavelength pumps robbing energy from the shorter wavelength pumps. To minimize this interaction, means of orthogonalizing the pumps so as to minimize interaction between them is needed.

Distributed Raman Amplification in Multi-Band Case

In broadband distributed Raman amplification, the nonlinear interaction between pumps for different bands can be minimized by spatially dispersing alternate band pumps and/or by cross-polarizing alternate band pumps. As an example, consider a periodically amplified system with discrete amplifiers placed every $L_{amp}$. Typically, the amplifier spacing may be on the order of $L_{amp}$=80 km. In some cases, there may also be access at some intermediate point, which might typically be about half-way between amplifiers. It is now desired to add distributed Raman amplification. This can be accomplished by using Raman oscillators or just laser diodes to pump the transmission line. There may be a number of bands that need to be amplified, so we designate:

$\lambda_i$=Raman pump wavelengths for gain in band i (may be more than one pump wavelength)

$\lambda_j$=Raman pump wavelengths for gain in band j (may be more than one pump wavelength)

i,k,m . . . one set of pump bands j,l,n . . . alternate set of pump bands (i.e., interleaved from above set).

Figure 15A:
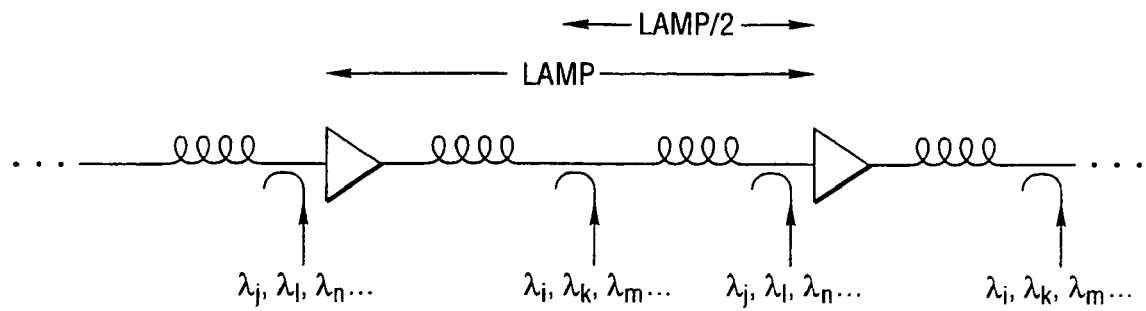
Figure 15B:
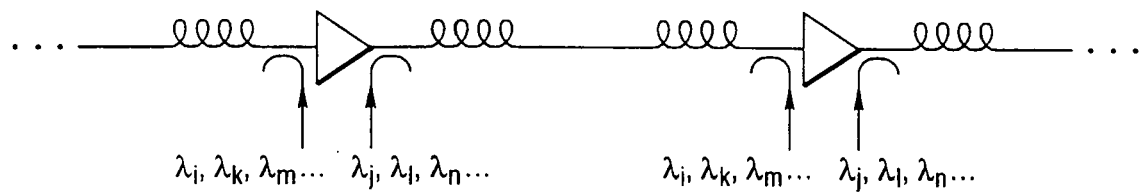
Figure 15C:
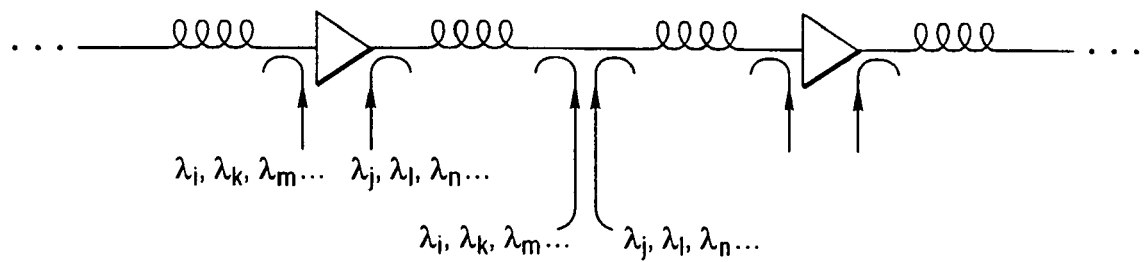
Figure 15B:
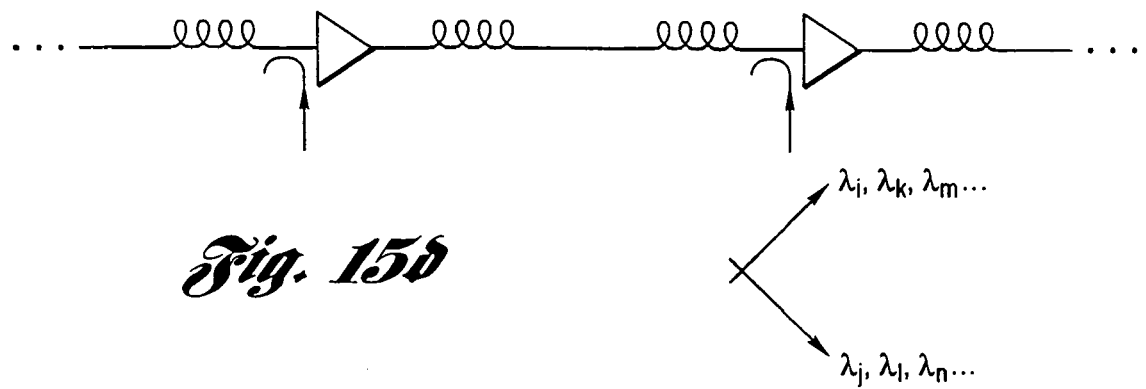

For the hybrid system consisting of discrete and distributed amplifiers, FIGS. 15(a)–15(d) show different configurations for adding the Raman pumps for different wavelength bands. FIG. 15(a) shows the situation where distributed amplification is added with only counter-propagating Raman pumps and assuming that access at the mid-point stage exists. In particular, alternate band pumps are added at different spatial points to minimize nonlinear interaction between pumps. If mid-span access is not available but bi-directional pumping is allowed, then the configuration of FIG. 15(b) can be used, where alternate band Raman pumps are launched in different directions to minimize interaction between pumps. If bi-directional pumping is allowed and mid-stage access is also available, then a more uniform pumping can be achieved using the configuration of FIG. 15(c). Finally, if only counter-propagating pumps are allowed and there is no mid-stage access, then the alternate pump bands can be launched orthogonally polarized, as in FIG. 15(d). This arrangement takes advantage of the fact that the Raman gain for cross-polarized light is about one-tenth the strength of Raman gain for co-polarized light. It should be apparent that the polarization multiplexing of FIG. 15(d) can also be combined advantageously with any of the other schemes of FIGS. 15(a)–15(c).

Figure 16A:
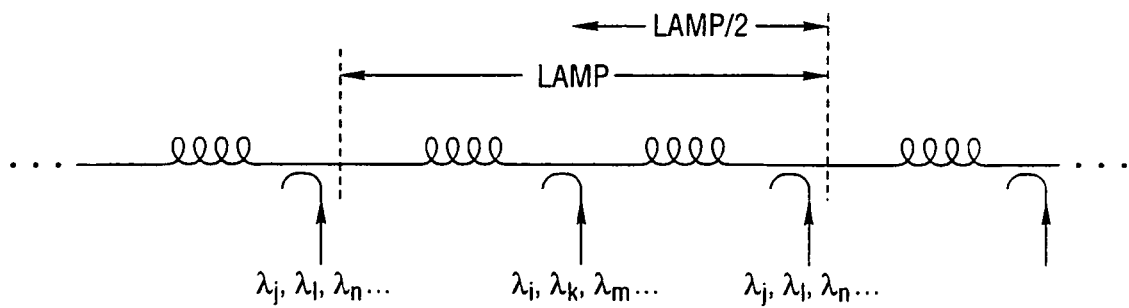
FIGS. 16(a)–16(d) are schematic views which depict only distributed Raman gain, rather than hybrid gain as described in FIGS. 15(a)–(d)
Figure 16B:
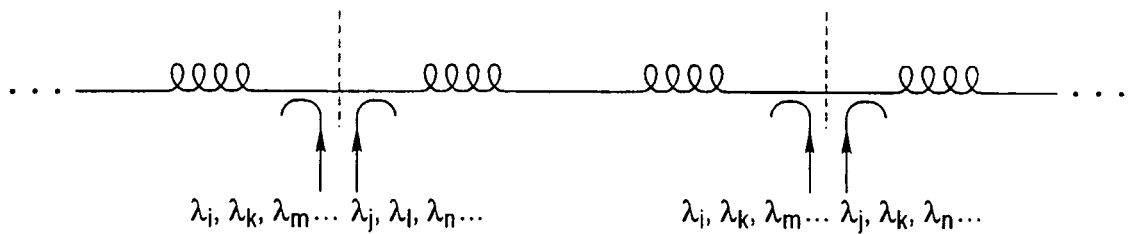
Figure 16C:
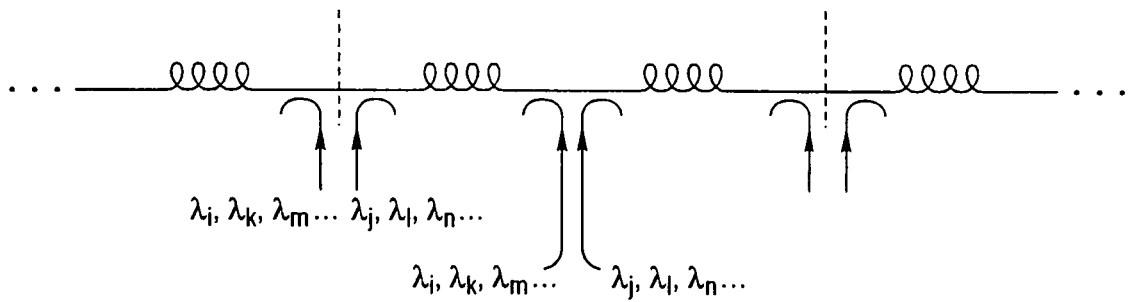
Figure 16D:
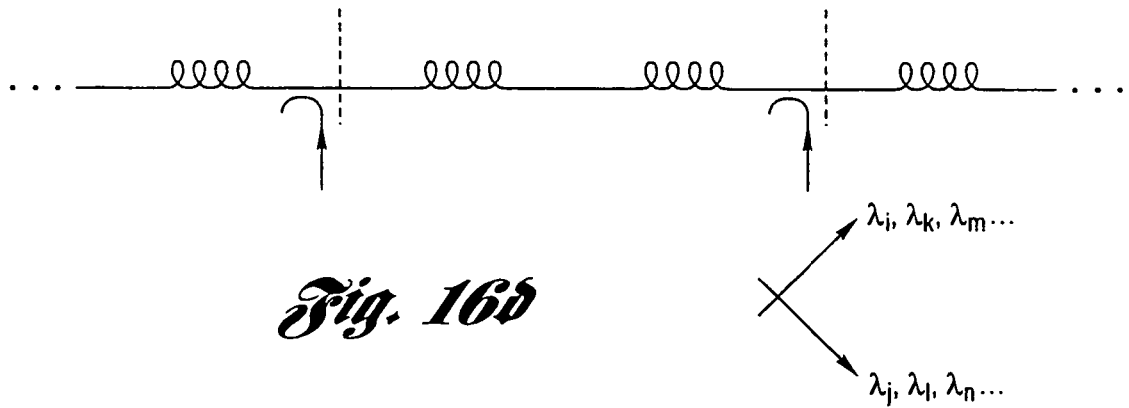

It may also be advantageous to use only distributed Raman gain, rather than hybrid gain as described above. FIGS. 16(a)–16(d) show the corresponding pumping configurations for only distributed Raman amplification. Once again, we assume a periodically amplified system with a period of $L_{amp}$. FIG. 16(a) shows a purely counter-propagating pumping scheme where mid-stage access exists. The alternate pump bands are spatially dispersed in this case. FIG. 16(b) illustrates a bi-directionally pumped situation with no mid-stage access, where alternate pumps are launched in different directions. FIG. 16(c) shows the combination of bi-directional pumping plus mid-stage access to make the gain more spatially uniform. Finally, FIG. 16(d) illustrates launch of alternate pump bands cross-polarized. Once again, the cross-polarized pumps of FIG. 16(d) can be advantageously combined with any of the configurations in FIGS. 16(a)–16(c).

In summary, the features of the present invention includes:

A) Dispersion compensation combined with a Raman amp:
(1) Raman amp in which the gain fiber also does dispersion compensation for transmission line
(2) fiber is single mode for pump and signal, meaning that the cut-off wavelength for the fiber is shorter than the pump wavelength
(3) the amplifier gain level is set larger or equal to the sum of losses in the dispersion-compensating fiber as well as the loss in a segment of the fiber link
(4) length and dispersion of the gain fiber is selected such that the net dispersion of the amplifier (D×L)$_{amp}$ roughly balances the net dispersion in the fiber transmission link (D×L)$_{Link}$
(5) Optical amplifier that provides optical gain that in the same element also compensates the dispersion of the link
(6) The gain medium is a fiber that serves as a distributed gain medium pumped by laser diodes or a Raman oscillator
(7) The pumping level is adjusted so that the gain compensates roughly for the loss in the fiber link and the loss in the dispersion compensating fiber
(8) The Raman oscillator is a cascaded Raman oscillator (9) The fiber is a dispersion compensating fiber
(10) fiber is single mode for pump and signal (cut-off wavelength for fiber is shorter than the pump wavelength)
(11) the fiber dispersion and length is selected to balance the total dispersion in the transmission link $(D \times L)_{amp}$ roughly equal and opposite to $(D \times L)_{Link}$
(12) the fiber is pumped from one direction if it is less than 4 $L_{eff}$ for the pump
(13) the fiber can be bi-directionally pumped if the length of the fiber exceeds the $L_{eff}$ for the pump
(14) the fiber can be split into two parts with two pumps if the length of the fiber exceeds substantially the $L_{eff}$ for the pump. The two amplifier segments may be joined by an isolator, a gain equalization element and/or an optical add/drop multiplexer.
(15) Raman amp in which the gain fiber also does dispersion compensation for transmission line
(16) where the gain is in the wavelength range 1390–1530 nm
(17) A Raman amplifier in which the gain fiber is a dispersion compensating fiber
(18) fiber whose length and dispersion are selected to compensate for the net dispersion of the fiber transmission link
(19) if the length of the fiber is greater than 2 Leff than it is bidirectionally pump
(20) if the length of the fiber is greater than 2 Leff than it is split into two parts that are pumped separately. The two segments may be joined by an isolator, a gain equalization element and/or an optical add/drop multiplexer.
(21) Specific configurations in FIGS. 4,5, and 6.

B) The use of "violet" band Raman amps with DSF:
(1) fiber link systems consisting of the use of dispersion shifted fibers and with operation in the wavelength range of 1430–1530 nm
(2) wavelength range selected to avoid the zero dispersion wavelength, so that multi-wavelength WDM systems can operate with minimal nonlinearity penalties
(3) the amplifier in the 1420–1530 nm range is a Raman amplifier
(4) the fiber in the Raman amplifier is selected to also serve as a dispersion compensating element
(5) fiber transmission system in dispersion shifted fiber, using Raman amplifiers operating over the 1430–1530 nm range
(6) the system being a multi-channel WDM system
(7) the wavelength range selected so as to reduce 4WM and parametric amplification cross-talk C) The use of Raman amps with dispersion managed systems:
(1) dispersion managed systems where the dispersion compensating elements are pumped by Raman pumps
(2) the gain level of the Raman is selected to compensate for the loss in the fiber link as well as the dispersion compensating element
(3) the dispersion compensating element can be pumped with one Raman pump or can be bi-directionally pumped or pumped in two segments, depending on L and Leff.
(4) Specific configuration of FIG. 8.

D) The symmetric addition of bands:
(1) to minimize gain tilt changes in the C-band, channels in the L-band should be added in roughly equal number to channels in the S-band. The roughly symmetric (channel number wise) channel addition balances Raman energy exchange in the C-band.
(2) The gain in the S-band must be larger than required to compensate for the linear loss to account for the Raman energy exchange. Likewise, the gain in the L-band should be smaller than required to compensate for linear loss.
(3) To have the same SNR in the C-band and S-band, the bit-rate in the S-band can be lowered or the S-band amplifier needs to have a lower noise figure.
(4) The amplifier in the S-band can be a Raman amplifier, which can have a lower noise figure due to the four-level nature of the amplifier.
(5) The zero dispersion wavelength for the fiber should be kept outside of all three bands to permit sufficient walk-off to minimize inter-channel interference.
(6) Whereas the amplifiers in the C-and L-bands can be discrete amplifiers, the S-band amplifier can be a distributed amplifier to achieve an improved noise figure.
(7) The distributed Raman amplification in the S-band can be achieved by pumping the transmission line with discrete laser diodes or by a Raman oscillator.

E) Distributed Raman amplification with multiple-bands:
(1) In multi-band distributed systems, means of orthogonalizing the pumps so as to minimize interaction or energy exchange between pump.
(2) In broadband distributed Raman amplification, the nonlinear interaction between pumps for different bands can be minimized by spatially dispersing alternate band pumps and/or by cross-polarizing alternate pump bands.
(3) The hybrid systems of FIGS. 15(*a*)–15(*d*).
(4) The distributed systems of FIGS. 16(*a*)–16(*d*).
(5) The distributed Raman amplification can be achieved by pumping the transmission line with discrete laser diodes or by a Raman oscillator.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An optical element operable to compensate for dispersion associated with a transmission link, the optical element comprising:
   an input port operable to receive an optical signal from at least one transmission link, the optical signal comprising one or more optical signal wavelengths, the at least one transmission link comprising a distributed Raman amplifier coupled to the input port and having a length, an optical loss, a dispersion, a sign of dispersion, and a cut-off wavelength;
   a Raman gain fiber coupled to the input port and operable to amplify the optical signal and to compensate for dispersion associated with the at least one transmission link, wherein the Raman gain fiber comprises a dispersion-length product that is approximately equal in magnitude to a dispersion-length product of the at least one transmission link and wherein the Raman gain fiber comprises a sign of dispersion that is opposite a sign of dispersion associated with the at least one transmission link;

a first pump source coupled to the Raman gain fiber and operable to generate a first pump signal that traverses the Raman gain fiber in a first direction; and a second pump source coupled to the Raman gain fiber and operable to generate a second pump signal that traverses the Raman gain fiber in a direction counter to the first direction, wherein the first pump signal and the second pump signal operate to compensate for the optical loss of the transmission link and an optical loss of the Raman gain fiber; and an output port for outputting the amplified optical signal.

2. The optical element of claim 1, wherein the Raman gain fiber has a cut-off wavelength shorter than the pump wavelength so that the gain fiber is single spatial mode for both the pump wavelength and the signal wavelength.

3. The optical element of claim 1, wherein the optical signal is amplified in open loop fashion.

4. The optical element of claim 1, wherein the distributed Raman amplifier is pumped bi-directionally by a pumping mechanism.

5. The optical element of claim 1, wherein the optical signal is amplified in a closed loop fashion.

6. The optical element of claim 1, wherein the Raman gain fiber at least partially defines a broadband cavity which is pumped bi-directionally by the pump source.

7. The optical element of claim 1, wherein the Raman gain fiber is a Raman gain fiber and wherein the broadband cavity is a Sagnac Raman cavity.

8. The optical element of claim 1, wherein the distributed Raman gain fiber includes a circular loop cavity and wherein the gain fiber has two separate segments which are pumped in a counter-propagating fashion by the pump source.

9. The optical element of claim 1, wherein the transmission line is a multi-wavelength transmission line having non-uniform gain over different wavelength channels and further comprising a second optical element for evening the non-uniform gain over the different wavelength channels.

10. The optical element of claim 1, wherein each of the first pump source and the second pump source include at least one laser diode.

11. The optical element of claim 1, wherein at least one of the first pump source or the second pump source includes a Raman oscillator.

12. The optical element of claim 1, wherein at least one of the first pump source or the second pump source includes a Raman wavelength shifter.

13. The optical element of claim 1, wherein the Raman gain fiber exhibits Raman scattering when pumped by at least one of the first pump source or the second pump source.

14. The optical element of claim 1, wherein the magnitude of the dispersion-length product of the distributed Raman gain medium that is approximately equal in magnitude to the dispersion-length product of the at least one transmission link comprises a dispersion-length product that is within ten percent (10%) of the magnitude of the dispersion-length product of the at least one transmission link.

15. The optical element of claim 3, wherein the Raman gain fiber has two separate gain segments.

16. The system of of claim 8, wherein the distributed Raman gain medium includes chirped bragg gratings.

17. The optical element of claim 9, wherein the second optical element includes at least one stage of Mach-Zehnder interferometers.

18. The optical element of claim 15, further comprising an isolator to connect the two segments.

19. The optical element of claim 15, further comprising a gain equalization element to connect the two segments.

20. The optical element of claim 15, further comprising an optical add/drop multiplexer to connect the two segments.

21. The optical element of claim 20, further comprising a gain equalization element connected to the optical add/drop multiplexer.

22. In a fiber-optic transmission system, the system comprising:

a signal input port operable to receive an optical signal from at least one transmission line, the optical signal comprising one or more signal wavelengths, the at least one transmission line having a length, an optical loss, a dispersion, a sign of dispersion, and a cut-off wavelength;

a Raman gain fiber coupled to the signal input port and operable to amplify the optical signal, the Raman gain fiber having an optical loss and comprising a first Raman gain segment and a second Raman gain segment, wherein the optical signal traverses the Raman gain fiber in a first direction;

a pump source configured to be coupled to the Raman gain fiber, the pump source operable to generate a pump signal to pump the Raman gain fiber to compensate for the optical loss of the transmission link and the optical loss of the Raman gain fiber, the pump signal comprising a pump wavelength and a pump power, wherein the pump source produces the pump signal at a pumping level sufficiently high so that the optical signal experiences a net gain;

a signal output port for outputting the optical signal; and a pump shunt coupled to the signal input port and the signal output port, the pump shunt operable to couple at least a portion of the pump signal between the first Raman gain segment and the second Raman gain segment, wherein the first Raman gain segment is coupled to the signal input port and the second Raman gain segment is coupled to the signal output port and wherein the pump signal traverses the first Raman gain segment in a direction counter to the first direction and then traverses the second segment to deplete the pump power of the pump signal.

23. The system of claim 22, further comprising an isolator to connect the first and second Raman gain segments.

24. The system of claim 22, further comprising a gain equalization element to connect the first and second Raman gain segments.

25. The system of claim 22, further comprising an optical add/drop multiplexer to connect the first and second Raman gain segments.

26. The system of claim 22, wherein the second Raman gain segment is pumped bi-directionally by the pump source.

* * * * *